(12) United States Patent
Jamrosz et al.

(10) Patent No.: US 8,019,504 B2
(45) Date of Patent: Sep. 13, 2011

(54) AIRCRAFT MAINTENANCE ANALYSIS TOOL

(75) Inventors: Bryan Scott Jamrosz, St. Louis, MO (US); Steven Wayne Eslinger, Cottleville, MO (US)

(73) Assignee: The Boeing Company, Chicago, IL (US)

( * ) Notice: Subject to any disclaimer, the term of this patent is extended or adjusted under 35 U.S.C. 154(b) by 659 days.

(21) Appl. No.: 12/138,033

(22) Filed: Jun. 12, 2008

(65) Prior Publication Data

US 2009/0312897 A1    Dec. 17, 2009

(51) Int. Cl.
*G06F 19/00* (2006.01)
(52) U.S. Cl. .................. 701/33; 701/3; 701/29
(58) Field of Classification Search .......... None
See application file for complete search history.

(56) References Cited

U.S. PATENT DOCUMENTS

| | | | |
|---|---|---|---|
| 2005/0085973 A1* | 4/2005 | Furem et al. | 701/50 |
| 2007/0112488 A1* | 5/2007 | Avery et al. | 701/35 |
| 2008/0010004 A1* | 1/2008 | Small et al. | 701/120 |
| 2009/0083050 A1* | 3/2009 | Eltman et al. | 705/1 |

OTHER PUBLICATIONS

"BI Systems Keep Navy Planes Flying", Sep. 2004, Government Enterprise, pp. 1-2.

* cited by examiner

*Primary Examiner* — Michael J. Zanelli
(74) *Attorney, Agent, or Firm* — Yee & Associates, P.C.

(57) ABSTRACT

A method is provided for identifying events that impact aircraft availability. Operational data, maintenance data, supply data, and provisioning data are collected for a plurality of aircraft from a plurality of sources to form collected data. The collected data is processed to form processed data containing a plurality of events, wherein the processed data is in a form needed to perform an analysis on the aircraft availability for the plurality of aircraft. A set of metrics relating to the aircraft availability for the plurality of aircraft is calculated from the processed data to form a set of calculated metrics. A set of trends relating to the set of calculated metrics affecting availability of the plurality of aircraft is identified.

20 Claims, 16 Drawing Sheets

SLZ7355 - TFG140

Repair Date   Order #                          Repair Facility                      MCN        NEXT_BCM_DATE   Flight Hrs.   Flights   CATs
11/27/2006   F18R0601991   THE BOEING COMPANY - NORTH ISLAND   AA65B2U   12/19/2006          11.6          8       8
  Discrepancy: AOA AND FCS CAUTION ALONG WITH 4 CHAN AOA FAIL. INITIALLY MULTIPLE FCS RESETS HAD NO EFFECT.          402
  Corrective Action: REPLACED WORN PARTS.

Repair Date   Order #                          Repair Facility                      MCN        NEXT_BCM_DATE   Flight Hrs.   Flights   CATs
5/14/2007    F18R0608355   THE BOEING COMPANY - NORTH ISLAND   PE3B1KW                                 168.6         94      94
  Discrepancy: RIGHT AOA PROBE DAMAGED DUE TO BASKET SLAP.                                                          404
  Corrective Action: REPLACED WORN PARTS.

*Install History*

| BUNO | INSTALLED |
|------|-----------|
| 165543 | 11/17/2006 |
| 165671 | 12/12/2006 |
| 165891 | 6/5/2007 |
| 166440 | 1/11/2008 |

*Removal History*

| BUNO | REMOVED | AT | ATMAL | WD |
|------|---------|----|-------|-----|
| 165678 | 4/13/2006 | R | 374 | C |
| 165543 | 12/13/2006 | T | 814 | O |
| 165671 | 12/18/2006 | R | 780 | H |
| 165891 | 10/2/2007 | R | 780 | H |

*I-Level BCM History*

| BUNO | BCM_DATE | AT | ATMAL | WD |
|------|----------|----|-------|-----|
| 165678 | 4/13/2006 | 1 | 070 | C |
| 165671 | 12/19/2006 | 1 | 374 | H |

*Flight Hours Between Install Removal*

| BUNO | Flight Hrs | Cats | Flts |
|------|------------|------|------|
| 165671 | 11.6 | 0 | 8 |
| 165891 | 168.6 | 90 | 94 |

*Flight Hours Since Last Install*

| INSTALL_D | REMOVED_ |
|-----------|----------|
| 12/12/2006 | 12/18/2006 |
| 6/5/2007 | 10/2/2007 |

VIDS/MAF Summary                                                                                              600

| GEA35439 | 12/20/2004 | AYLF | 165591 | VMA-311 | Yuma | | | | | | | | | | |

REMOVED P/N ... INSTALL P/N

| Suffix | M | S/N | Nomenclature | NIIN | IP | WD | EMT | MMH | AORG | WC | S/N | Compl Date | MCN | NMCM | NMCS | PMCM | PMCS |
|---|---|---|---|---|---|---|---|---|---|---|---|---|---|---|---|---|---|
| 1 | | 450SUM5 331 | DISPLAY UNIT | 999308516 | 1 | H | 1 | 1 | GEA | 200 | 450SUM5 331 | 2/1/2005 | GEA5FQ1 | 0 | 0 | 1.01667 | 0 | — 602

WUC 73X3M00 SU158/A HEAD UP DISPLAY UNIT
AT R Remove and Replace
HOWMAL 290 FAILS - DIAGNOSTIC/AUTOMATIC TESTS
H-Z Failed Parts: FAIL PART Item ID QTY AT MAL
AVDLR: NIN NOMEN AVDLR

REMOVED P/N ... INSTALL P/N

| Suffix | M | S/N | Nomenclature | NIIN | IP | WD | EMT | MMH | AORG | WC | S/N | Compl Date | MCN | NMCM | NMCS | PMCM | PMCS |
|---|---|---|---|---|---|---|---|---|---|---|---|---|---|---|---|---|---|
| 2 | | 450SUM5 331 | DISPLAY UNIT | 999308516 | 1 | H | 2.8 | 5.6 | GE1 | 650 | | 1/11/2005 | GE144F7 | 0 | 0 | 0 | 0 | — 604

WUC 73X3M00 SU158/A HEAD UP DISPLAY UNIT      Action Org: MALS-13
AT C Repair of an item identified by a WUC
HOWMAL 127 ADJUSTMENT OR ALIGNMENT: IMPROPER
H-Z Failed Parts: FAIL PART Item ID QTY AT MAL
SUM2922-3 PSI 101  1  R  290
AVDLR: NIN NOMEN AVDLR

REMOVED P/N ... INSTALL P/N

| Suffix | M | S/N | Nomenclature | NIIN | IP | WD | EMT | MMH | AORG | WC | S/N | Compl Date | MCN | NMCM | NMCS | PMCM | PMCS |
|---|---|---|---|---|---|---|---|---|---|---|---|---|---|---|---|---|---|
| 1A | 2 | SUM2928-4 500 | POWER SUPPLY ASSEMB (HVPS) | 011936688 | 1 | W | 0 | 0 | GE1 | 05A | | 1/5/2005 | GE144S3 | 0 | 0 | 0 | 0 | — 606

WUC 73X3M20 POWER SUPPLY ASSEMBLY (HVPS)      Action Org: MALS-13
AT 1 BCM - Repair not authorized
HOWMAL 000 ADMINISTRATIVE - LOOK PORTION OF INSP, OR WR FOR MFG OR
H-Z Failed Parts: FAIL PART Item ID QTY AT MAL
AVDLR: NIN NOMEN AVDLR

REMOVED P/N ... INSTALL P/N

| Suffix | M | S/N | Nomenclature | NIIN | IP | WD | EMT | MMH | AORG | WC | S/N | Compl Date | MCN | NMCM | NMCS | PMCM | PMCS |
|---|---|---|---|---|---|---|---|---|---|---|---|---|---|---|---|---|---|
| 1B | 2 | SUM2922-3 991 | TRANSFORMER, POWER | 994461934 | 1 | W | 0 | 0 | GE1 | 05A | | 1/7/2005 | GE14530 | 0 | 0 | 0 | 0 | — 608

WUC 73X3M00 SU158/A HEAD UP DISPLAY UNIT      Action Org: MALS-13
AT 1 BCM - Repair not authorized
HOWMAL 000 ADMINISTRATIVE - LOOK PORTION OF INSP, OR WR FOR MFG OR
H-Z Failed Parts: FAIL PART Item ID QTY AT MAL
AVDLR: NIN NOMEN AVDLR

| Rank (902) | Part Number (904) | 1 | 2 | 3 | 4 | 5 | 6 | 7 | 8 | 9 | 10 | 11 | 12 | T-TEST (908) |
|---|---|---|---|---|---|---|---|---|---|---|---|---|---|---|
| 1 | 74A730471-1001 | 9 | 1 | 5 | 6 | 17 | 10 | 7 | 4 | 9 | 9 | 9 | 8 | 5.500 |
| 2 | 74B430670-101 | 7 | 4 | 3 | 10 | 2 | 9 | 5 | 7 | 18 | 15 | 11 | 11 | 4.628 |
| 3 | 210-B-42007 | 1 | 0 | 0 | 1 | 1 | 0 | 0 | 0 | 3 | 2 | 1 | 2 | 3.980 |
| 4 | MBEU146790 | 0 | 0 | 0 | 0 | 0 | 0 | 0 | 0 | 6 | 9 | 3 | 3 | 3.656 |
| 5 | 74A325608-1007 | 0 | 0 | 0 | 1 | 0 | 2 | 0 | 0 | 1 | 1 | 2 | 1 | 3.500 |
| 6 | 0711324-012 | 2 | 4 | 6 | 3 | 6 | 4 | 4 | 2 | 9 | 6 | 7 | 5 | 3.367 |
| 7 | 1180000-1 | 2 | 3 | 4 | 5 | 4 | 6 | 4 | 5 | 9 | 7 | 11 | 5 | 3.002 |
| 8 | ST3M753-10D32 | 0 | 0 | 0 | 0 | 0 | 0 | 0 | 0 | 0 | 1 | 1 | 1 | 3.000 |
| 9 | 242607-2 | 0 | 0 | 0 | 0 | 0 | 0 | 0 | 0 | 0 | 1 | 1 | 1 | 3.000 |
| 10 | 1023351G-2 | 0 | 0 | 0 | 0 | 0 | 0 | 0 | 0 | 1 | 1 | 1 | 0 | 3.000 |
| 11 | 74A343517-2005 | 0 | 3 | 3 | 2 | 1 | 2 | 0 | 0 | 3 | 2 | 3 | 5 | 2.980 |
| 12 | 74A350006-2029 | 0 | 4 | 5 | 3 | 8 | 11 | 7 | 12 | 7 | 13 | 9 | 12 | 2.905 |

900 / 906

AIRCRAFT MAINTENANCE ANALYSIS TOOL

BACKGROUND INFORMATION

1. Field

The present disclosure relates generally to an improved data processing system and in particular to a method and apparatus for processing aircraft data. Still more particularly, the present disclosure relates to computer implemented method, apparatus, and computer program code for analyzing events that impact aircraft availability.

2. Background

Aircraft maintenance relates to analysis and actions that are performed to maintain and/or improve the airworthiness and reliability of an aircraft and the systems, subsystems, and components of the aircraft through out the life cycle of the aircraft. The actions that may be performed with respect to aircraft maintenance include the development of aircraft maintenance programs according to manufacture guidelines. Monitoring, control, and/or implementation of airworthiness directives issued by aviation regulatory authorities for an aircraft also may be performed as part of aircraft maintenance.

Further, aircraft maintenance also may include performing one or more of overhaul, repair, inspection, replacement, modification, or other suitable actions with respect to an aircraft part. These actions may be performed as part of an aircraft maintenance program. Further, aircraft maintenance also may include conducting periodic inspections based on calendar time, time in service, flight cycles, and/or landing cycles.

Currently, data is gathered to perform operation and maintenance analysis on aircraft. This analysis may be performed to identify whether maintenance has been performed for all of the aircraft within a fleet. Further, this analysis may be formed to determine what maintenance operations have been performed and what maintenance operations may need to be performed for an aircraft. Currently available systems are used to ensure that maintenance has been performed on the various aircraft in a fleet based on maintenance schedules and reported events that may require maintenance operations to be performed for various parts. In this manner, currently used maintenance programs may ensure that maintenance operations are performed on aircraft in a timely manner. These maintenance systems also may be employed to track current inventories of parts that may be needed for maintenance.

SUMMARY

In one advantageous embodiment, a method is provided for identifying events that impact aircraft availability. Operational data, maintenance data, supply data, and provisioning data are collected for a plurality of aircraft from a plurality of sources to form collected data. The collected data is processed to form processed data containing a plurality of events, wherein the processed data is in a form needed to perform an analysis on the aircraft availability for the plurality of aircraft. A set of metrics relating to the aircraft availability for the plurality of aircraft is calculated from the processed data to form a set of calculated metrics. A set of trends relating to the set of calculated metrics affecting availability of the plurality of aircraft is identified.

In another advantageous embodiment, an apparatus comprises a data collection unit, a data processing unit, a metric calculation unit, a data analysis unit, and a set of data processing systems. The data collection unit is capable of collecting operational data, maintenance data, supply data, and provisioning data for a plurality of aircraft from a plurality of sources to form collected data. The data processing unit is capable of processing the collected data to form processed data containing a plurality of events, wherein the processed data is in a form needed to perform an analysis on aircraft availability for the plurality of aircraft. The metric calculation unit is capable of calculating a set of metrics relating to the aircraft availability for the plurality of aircraft from the processed data to form a set of calculated metrics. The data analysis unit is capable of identifying a set of trends relating to the set of calculated metrics affecting availability of the plurality of aircraft. The data collection unit, the data processing unit, the metric calculation unit, and the data analysis unit execute on the set of data processing systems.

In still another advantageous embodiment, a computer program product is present for identifying reliability events that impact aircraft availability. The computer program product comprises a computer recordable storage medium and program code. Program code is present for collecting operational data, maintenance data, supply data, and provisioning data for a plurality of aircraft from a plurality of sources to form collected data. The computer recordable storage medium also includes program code for processing the collected data to form processed data containing a plurality of events, wherein the processed data is in a form needed to perform an analysis on the aircraft availability for the plurality of aircraft. Program code is present for calculating a set of metrics relating to the aircraft availability for the plurality of aircraft from the processed data to form a set of calculated metrics. Program code is present for identifying a set of trends relating to the set of calculated metrics affecting availability of the plurality of aircraft.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 4 is a diagram illustrating a portion of a serial number tracking report in accordance with an advantageous embodiment;

FIG. 6 is a diagram of sequenced events in accordance with an advantageous embodiment;

FIG. 7 is an illustration of metric calculations in accordance with an advantageous embodiment;

DETAILED DESCRIPTION

Figure 1:
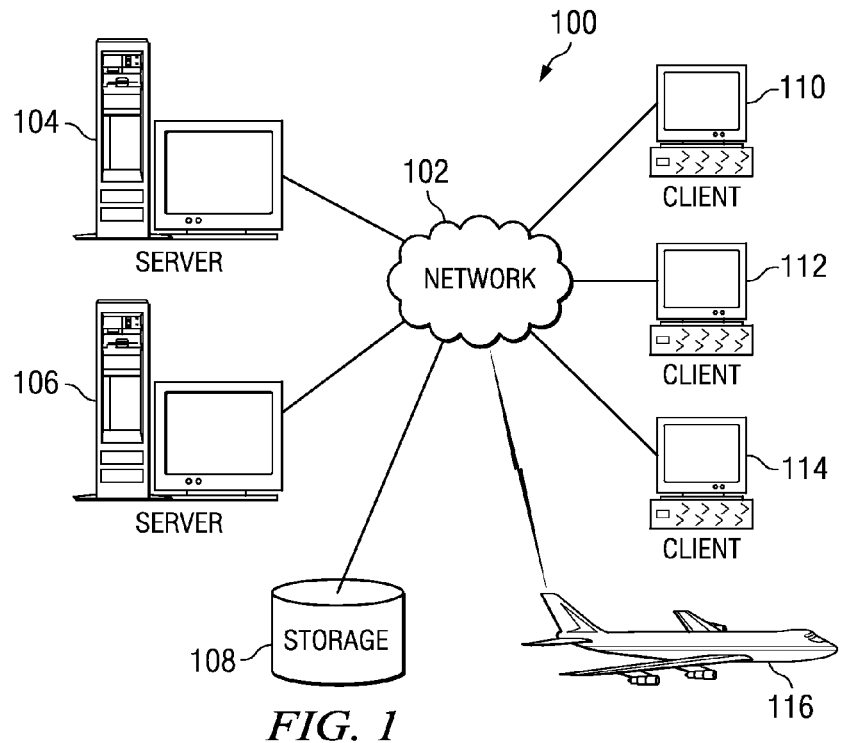
FIG. 1 is a pictorial representation of a network of data processing systems in which advantageous embodiments may be implemented.
Figure 2:
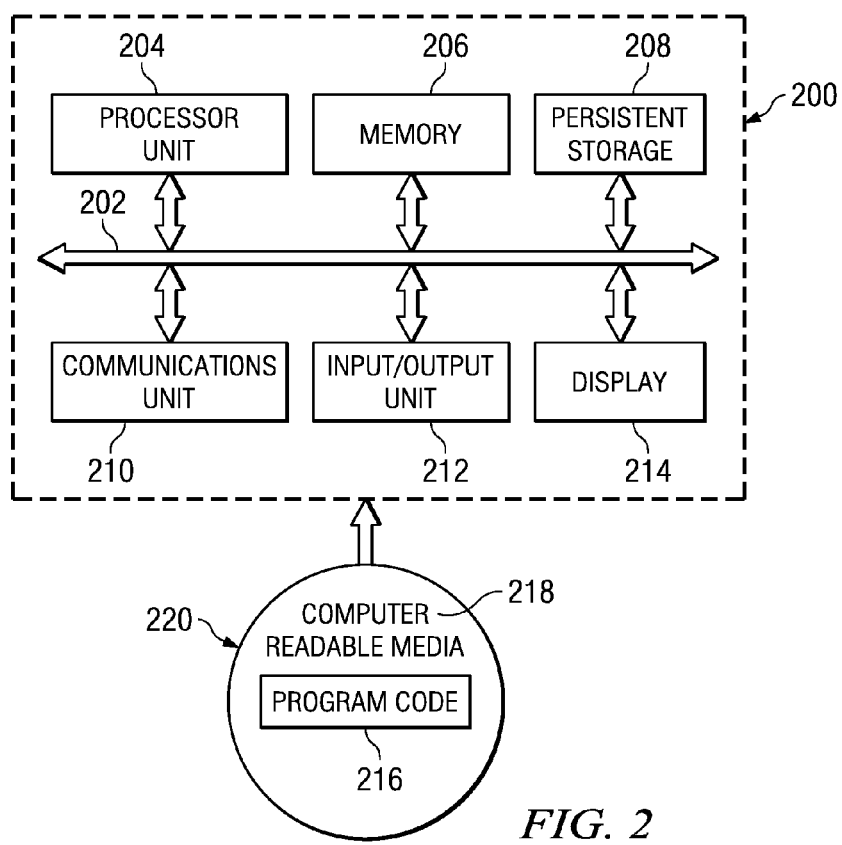
FIG. 2 is a diagram of a data processing system in accordance with an illustrative embodiment.

With reference now to the figures and in particular with reference to FIGS. 1-2, exemplary diagrams of data processing environments are provided in which the advantageous embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which advantageous embodiments may be implemented. Network data processing system 100 is a network of computers in which embodiments may be implemented. Network data processing system 100 contains network 102, which is the medium used to provide communications links between various devices and computers connected together within network data processing system 100.

Network 102 may include connections, such as wire, wireless communication links, or fiber optic cables. In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Aircraft 116 also is a client that may exchange information with clients 110, 112, and 114. Aircraft 116 also may exchange information with servers 104 and 106. Aircraft 116 may exchange data with different computers through a wireless communications link while in-flight or any other type of communications link while on the ground.

In these examples, server 104, server 106, client 110, client 112, and client 114 may be computers located at different facilities used to perform maintenance. Further, some of these clients may be located at suppliers or other locations. Server 104 and/or server 106 may implement aircraft availability analysis tools in accordance with the advantageous embodiments. This aircraft availability analysis may be performed for aircraft, such as aircraft 116. In these examples, an aircraft is available if the aircraft is ready to perform a mission. The mission may be, for example, to transfer cargo, personnel, survey an area, or some other suitable operation.

The analysis may be performed for entire fleets of aircraft, squadrons or other suitable subsets of aircraft. Further, this analysis may be performed with respect to various components, subassemblies, assemblies, or other groupings of components within aircraft 116. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

Turning now to FIG. 2, a diagram of a data processing system is depicted in accordance with an illustrative embodiment. Data processing system 200 is an example of a data processing system that may be used to implement servers and clients, such as server 104 and client 110 in FIG. 1. Further, data processing system 200 is an example of a data processing system that may be found in aircraft 116 in FIG. 1.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as, program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media x18 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media 218 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different advantageous embodiments recognize that currently available maintenance processes and programs are unable to effectively perform an analysis of aircraft availability based on multiple sources and types of data. For example, the different advantageous embodiments recognize that currently used systems are unable to collect and use operational data, maintenance data, supply data, and provisioning data in a manner that may provide the capability to identify the reliability events that may impact aircraft availability. Events that impact aircraft availability are also referred to as reliability events. An event is any action and/or occurrence that involves a part.

Thus, the different advantageous embodiments provide a computer implemented method, apparatus, and computer usable program code for identifying reliability events that may impact aircraft availability. Operational data, maintenance data, supply data, and other suitable data for aircraft may be collected from many sources to form collected data. This other data may include, for example, without limitation, provisioning data and logistics data for aircraft. Collected data is processed to form processed data in which the processed data is in a form needed to form analysis in the aircraft availability for the aircraft. The process data may then be used to calculate metrics for the aircraft. These metrics are various variables or parameters of interest with respect to the aircraft availability. The process may then identify trends relating to metrics affecting the availability of the aircraft. In this manner, a prediction of future aircraft availability also may be predicted or generated from the different trends.

Figure 3:
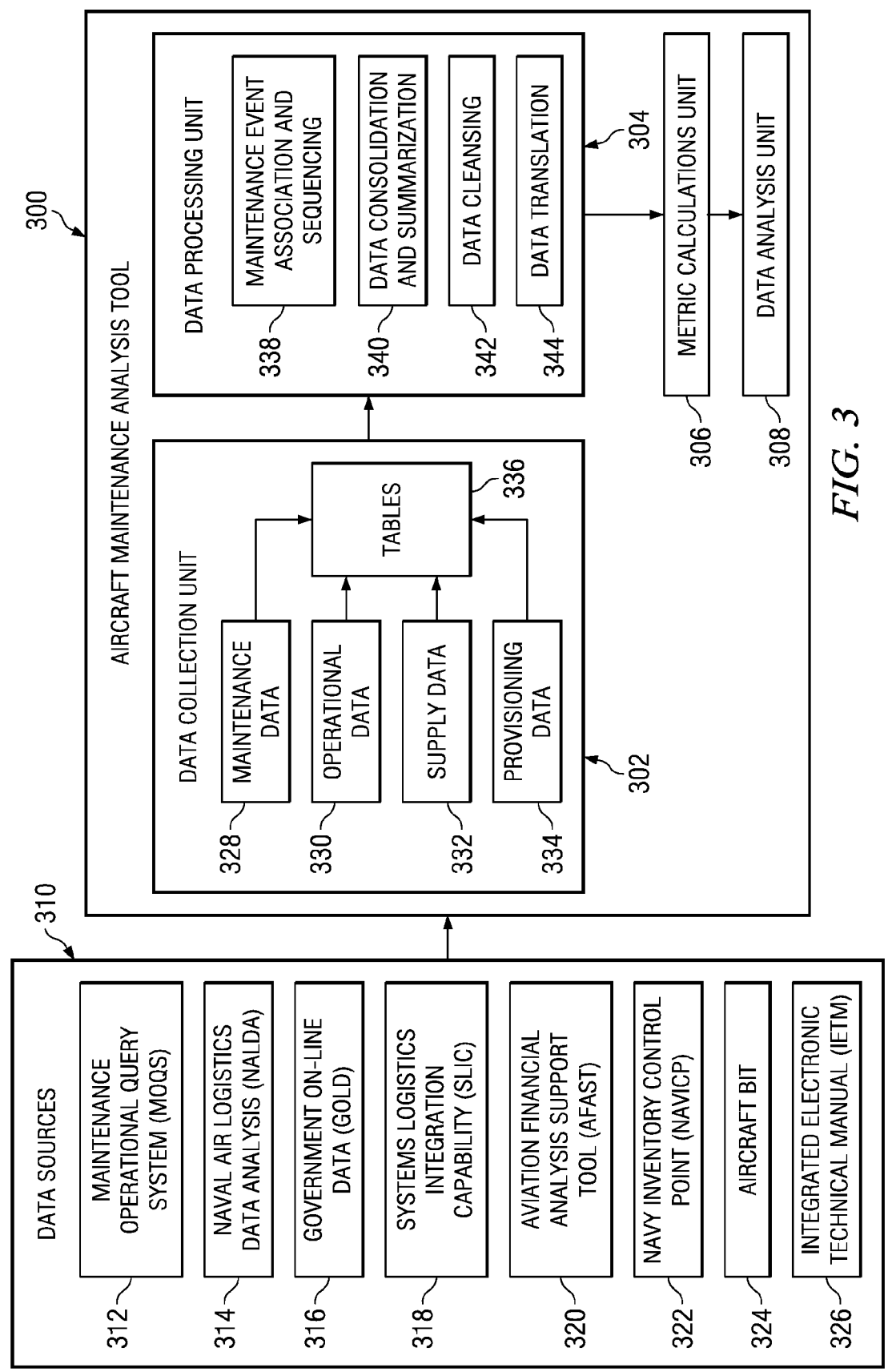
FIG. 3 is a block diagram of an aircraft maintenance analysis tool in accordance with an advantageous embodiment.

With reference now to FIG. 3, a block diagram of an aircraft maintenance analysis tool is depicted in accordance with an advantageous embodiment. In this example, aircraft maintenance analysis tool 300 includes a number of functional components. As depicted, aircraft maintenance analysis tool 300 includes data collection unit 302, data processing unit 304, metric calculations unit 306, and data analysis unit 308. Aircraft maintenance analysis tool 300 may receive data from data sources 310. In the examples, data sources 310 contains data regarding the operation, maintenance, supply, and provisioning of aircraft for which an analysis may be made. Maintenance data, in these examples, is data about the maintenance performed on an aircraft. This maintenance may include, actions, such as, for example, performing maintenance on components in the aircraft or on components that may have been removed from the aircraft for repairs or other maintenance operations. Operational data is data about the usage and operation of aircraft. Supply data contains information about components or parts that may be used in the aircraft. The supply data may include information relating to, for example, shipping, availability, and receipt of different parts. Provisioning data is data about the parts themselves. This data may include an identification of the breakdown of parts in the subcomponents, as well as the reliability of the parts. The provisioning data also may include information about the interchangeability of similar or like components for a part. Further, provisioning data may include supercedure information containing details about the current generation or version of components used in a part. This information also includes applicability or usage of a part for a specific serial numbered aircraft.

As used in these different advantageous embodiments, a part may be at any level of an aircraft. A part, as used herein, may be an entire aircraft, a system in the aircraft, a subsystem, sub components, consumable parts and/or individual components in a system. In these examples, data sources 310 includes maintenance operational query system (MOQS) 312, naval air logistics data analysis (NALDA) 314, government on-line data (GOLD) 316, systems logistics integration capability (SLIC) 318, aviation financial analysis support tool (AFAST) 320, Navy inventory control point (NAVICP) 322, aircraft BIT 324, and integrated electronic technical manual (IETM) 326.

In these examples, maintenance operation query system 312 is a relational database storing maintenance and operational data collected from equipments owners and operators. Naval air logistics data analysis 314 collects, manages, and disseminates data relating to the maintenance, operation, and configuration management of Navy operated assets in these examples. System logistics integration capability 318 is a relational database supporting document logistic support analyses. This database may include, for example, provisioning data, reliability data, maintainability data, and system supportability details relating to various maintenance processes. Aviation financial analysis support tool 320 may be used to evaluate financial performance as relates to requisitioning of repair parts. This tool may provide data regarding the requisitioning of repair parts.

Navy inventory control point 322 includes information about depot level repair activities. This information may include, depot level repair charges paid by navy squadrons for parts turned in for repair. Aircraft built in test 324 may contain fault data for any number of aircraft systems that are capable of self identifying a failure event. This database may identify a specific part that experienced a failure as well as some basic characteristics of the event. These characteristics may include, for example, the date and time of the event, identification of internal components experiencing a failure, and the configuration or operational parameters of the aircraft when the event occurred.

Integrated electronic technical manual 326 is a data processing system based manual used by maintenance personnel to carry out repair activities. This electronic manual may include instructions on trouble shooting, repair, and check out procedures for a part. Further, the manual may identify a required skill set and time requirements for the personnel performing the activity as well as any required equipment or repair parts. Of course, any data source may be used in addition to or in place of the ones illustrated to collect the data needed to perform analysis regarding an aircraft.

Data collection unit 302 stores data from data sources 310 into groupings, such as maintenance data 328, operational data 330, supply data 332, and provisioning data 334. In these examples, provisioning data 334 may include, for example, part nomenclature, national stock numbers, supply codes, maintainability codes, recoverability codes, head of family identification, parts breakdown data, reliability values, work unit code and part number cross reference data, maintenance concepts, and other suitable data.

Maintenance data 328 includes maintenance events for parts, as well as data relating to these events. This data may take various forms. For example, maintenance data 328 may include, for example, actions taken to return an item to an operable condition, equipment identification, discrepancy and corrective action reports, when a malfunction is discovered, malfunction reason, repair parts used, applicable serial numbers, maintenance times, location of the work performed, start and/or stop times, and other suitable information.

Supply data 332 may include, for example, part details, task requirement data, requisition date, receipt date, quantity, price, quality, and other suitable information.

Operational data 330 may include, for example, operational related events, operation times, mission type, crew size, type of equipment, owner, mission capability status, reporting status, and other suitable information.

In these examples, these different types of data may be stored in tables 336. Of course, in other advantageous embodiments, the data may be stored using other types of data structures, such as, for example, databases, arrays, flat files, or other suitable data structures.

This data may be received from data sources in a number of different ways. For example, the data may be received directly from external databases, read in from a flat file, or entered by a user into tables 336. In these examples, tables 336 may be organized based on data type. A table in tables 336 may store individual organizational and intermediate level maintenance events. Another table in tables 336 may store supple data. Additional tables may store operational data. In one table in tables 336, operational data may be stored containing a monthly summary of availability and flight events. A daily account of operational events may be stored in another table within tables 336.

In these examples, multiple tables may be created for each coded field requiring translation. Of course these are only examples of how tables may be organized and tables may be organized in other manners depending on a particular embodiment.

The data in tables 336 may take the form of maintenance forms, depot repair data, operational data, requisition forms, translation codes, squadron status reports, intermediate component lists, asset visibility data, repair and consumable costs, and other suitable types of data. In the different advantageous embodiments, the data may be maintained in its "raw" input format and stored in its unchanged original format. This type of storage may be used to maintain data integrity and traceability back to the source of the data.

Data contained in an organizational and intermediate level maintenance table within tables 336 may include a detailed account of all maintenance events performed on aircraft with the part in place or events that occur off aircraft at a local repair facility. This data would typically be supplied by data sources 310, such as maintenance operational query system (MOQS) 312, naval air logistics data analysis (NALDA) 314.

Data contained in the depot maintenance table may have a detailed account of the maintenance events that have occurred at a depot repair facility or original equipment manufacturer. Data is typically retrieved from the government on-line data (GOLD) 316 in data sources 310.

Data stored in a supply table in tables 336 may include detailed data found on part requisition forms. These records typically identify the organization that requires the part, part number, date ordered, cost, etc. Requisition data typically is obtained from supply driven databases such as government on-line data (GOLD) 316, aviation financial analysis support tool (AFAST) 320, or Navy inventory control point (NAVICP) 322 in data sources 310.

Data contained in the provisioning table in tables 336 may include details about the part such as part number, nomenclature, national item identification number, source maintenance and recoverability (SM&R) code, aircraft effectivity/supercedure information, and head of family details. This information may be obtained from systems logistics integration capability (SLIC) 318 in data sources 310.

Data in the detail operation table in tables 336 consists of the daily flight records as reported by the aircraft's pilot. This table may include details, such as, for example, the number of missions, types of missions, and number of flight hours flown. This data may be from maintenance operational query system (MOQS) 312 and naval air logistics data analysis (NALDA) 314 in data sources 310.

The data that is stored in the operational monthly summary table in tables 336 is typically a summarization of the daily flight events. This table also may indicate the monthly availability hours of the aircraft, and is obtained from the same source as the detailed operational records.

Multiple translation definition tables may be present in tables 336 that are used to convert coded data to language that is more understandable by a human reader. These tables may be used to translate codes, such as, for example, action taken codes, work unit codes, and malfunction codes, among others found in the maintenance, operational, and supply data.

Translation code data is typically obtained from the same data source from which the operational, maintenance, or supply data is obtained.

The data in tables 336 is then processed by data processing unit 304. In these examples, data processing unit 304 may include functions, such as maintenance event association and sequencing 338, data consolidation and summarization 340, data cleansing 342, and data translation 344. Maintenance event association and sequencing 338 may be used to associate the data with any event that has occurred for a part. In other words, every step of a maintenance action may be traceable and linked together based on characteristics of an event. In this manner, events for a part may be placed into a sequence for various types of categories for analysis.

Data consolidation and summarization 340 may be used to place data in a format for further analysis. This processing of the data may allow for an identification of trends in which similarities or differences in repair cycles of different repair facilities over a period of time may be identified. Further, this process data may be used to identify progression of a part through a repair cycle and identify the scope and depth of the repair required for the part. The data also may be used to identify current stage of repair for a part.

Data cleansing 342 may be performed to place data into a condition that may be used by metric calculations unit 306 and data analysis unit 308. Data cleansing 341 conditions data for analysis. This process may include, for example, the assignment of a trend work unit code for use in referencing parts and operations. Data cleansing 341 also may eliminate or remove special characters and random spaces found in many fields of the data records. This processing eliminates much of the error that may occur when attempting to match query criteria to a data record. Elimination of special characters is most often accomplished on record fields such as part number, part nomenclature, serial number, work unit code, and date fields.

Additionally, data cleansing 341 may include the creation of supplementary fields to provide a means to consolidate or summarize data in the metric calculations unit 306 or data analysis unit 308. These supplementary fields may include system, sub-system, or component associations based on the work unit code identified in the maintenance record. In these examples, the first two digits of the work unit code typically identify the system. The third digit typically identifies the sub system, and remaining characters identify the part or sub components.

These supplemental fields provide a means to group and summarize data at multiple levels of detail. A supplemental data field also may be generated for many of the date/time fields for maintenance and operational records. The supplemental date fields are generated for the start and end dates of the event and identify the month and year (excludes day of month) of the event providing a simplified field for data consolidation.

During the conditioning process performed by data cleansing 341, supplemental data may be added to provide additional capability to query for and summarize the desired records. In many cases, the national item identification number or head of family data from the provisioning data obtained by the data collection unit 302 may be added to the record based on the part number reported on the event record.

Data translation 344 may place the data in a format that is usable by metric calculations unit 306. In these examples, data translation 344 may simplify the analysis of data by translating coded information contained within records in tables 336. Data translation 344 may be performed to place tables 336 into a format that is usable by metric calculations unit 306. Data fields contained in tables 336 that may require data translation 334 include, for example, work unit codes, type equipment codes, action taken codes, malfunction codes, when discovered codes, type of maintenance codes, work center codes, awaiting parts and awaiting maintenance codes, organization codes, and other suitable codes.

Provisioning data 334 may contain logistics and provisioning data. This data may be in a database that contains information about system design and/or operational capability of aircraft and parts. Provisioning data 334 also may be used to identify the structure of parts breakdown of the aircraft and its components.

Additionally, this information also may include data about reliability factors for the aircraft. Provisioning data 334 may be used to form a cross comparison of actual part usage from field maintenance events to a parts breakdown list identified from engineering data. These types of comparisons may be performed to verify that the part is performing as designed and meeting reliability expectations.

Metric calculations unit 306 contains processes used to identify various metrics for parts. These metrics include, for example, aircraft mission capability and utilization, aircraft cycle time, awaiting parts, awaiting maintenance, turn-around times, repair and scrap rates, supply fill rate, cannibalization rates, no defect rate, total repair cost, mean flight hour between unscheduled maintenance action, mean flight hour between removal, mean flight hour between demand, and other suitable metrics.

Data analysis unit 308 may perform various types of analysis based on metrics generated by metric calculations unit 306. This analysis also may include identifying trends with respect to various parts. In these examples, the data analysis may be performed to identify reliability events that may impact aircraft availability. Further, data analysis unit 308 also may be used to identify trends relating to the metrics that affect availability of the aircraft.

In the different illustrative examples, trend analysis may provide the ability to identify the tendency of a metric to increase and/or decrease over a period of time. Trend identification may be used for advanced detection of situations, such as, for example, an increasing failure, removal, maintenance man hour, or beyond capability of maintenance rates. Changes in failure or removal rates can be an indicator of degrading part due to a number of different factors, such as, for example, part aging, changes in operating parameters, changes in manufacturers or manufacturing techniques, changes in maintenance processes, or a number of other factors.

As another example of trend analysis, variances in maintenance man hour rates or beyond capability of maintenance rates can be an indicator of changes in the abilities of the maintainer, such as improved system knowledge over time or the influx of new maintenance personnel. Changes in these types of metrics can also be attributed to changes in the maintenance processes or changes in the capabilities of support equipment used during maintenance activities. Additionally, these trends may be impacted by part availability and a number of other factors.

Further, data analysis unit 308 may be used to perform predictions of future aircraft availability based on the different trends. Predictions may be made using the trend data generated by metric calculations unit 306. The propensity of a trend to increase or decrease may be identified by calculating the average slope of a line over time. Predictions may be made by creating a linear projection using the value of slope calculated using historical data and applying that slope factor out to project values or rates at future points in time to anticipate the future needs such as increases and/or decreases in supply, manpower, and/or funding.

More complicated predictive models may use supply data, such as part availability, to demonstrate the impacts that an improved and/or diminishing supply chain may have on aircraft maintenance and overall aircraft availability. Other predictive models may require reliability data from other sources to identify the impacts of changing reliability factors such as those resulting from engineering changes. In the advantageous embodiments, predictive models may be used as an evaluation tool to determine what initiatives are worth pursuing based on the potential for improved aircraft availability or cost reductions.

In these examples, data analysis unit 308 may perform various types of analysis including, for example, without limitation, drill down data analysis, data modeling, high driver identification, trend analysis and triggering, improvement opportunity identification, component performance reports, cradle to grave component tracking, squadron performance reports, repair efficiency analysis, repair bill of material listing, life cycle cost analysis, events leading to failure reports, and other suitable analysis.

The illustration of aircraft maintenance analysis tool 300 and the different components are not meant to imply architectural limitations on the manner in which different advantageous embodiments may be implemented. The different units are depicted are functional components that may be implemented in different ways. For example, metric calculations unit 306 and data analysis unit 308 may be implemented as a single software component rather than as two components.

With reference now to FIG. 4, a diagram illustrating a portion of a serial number tracking report is depicted in accordance with an advantageous embodiment. In this example, report 400 is an example of a report that may be generated by data analysis unit 308 in FIG. 3. This report lists a sequence of events that have occurred for each part in sections 402 and 404. Additionally, these sections also identify the number of operational hours for each part. Section 406 includes information relating to install history, removal history, flight hours between installing and removal, I-level beyond capability of maintenance (BCM) history, and other suitable information.

Figure 5:
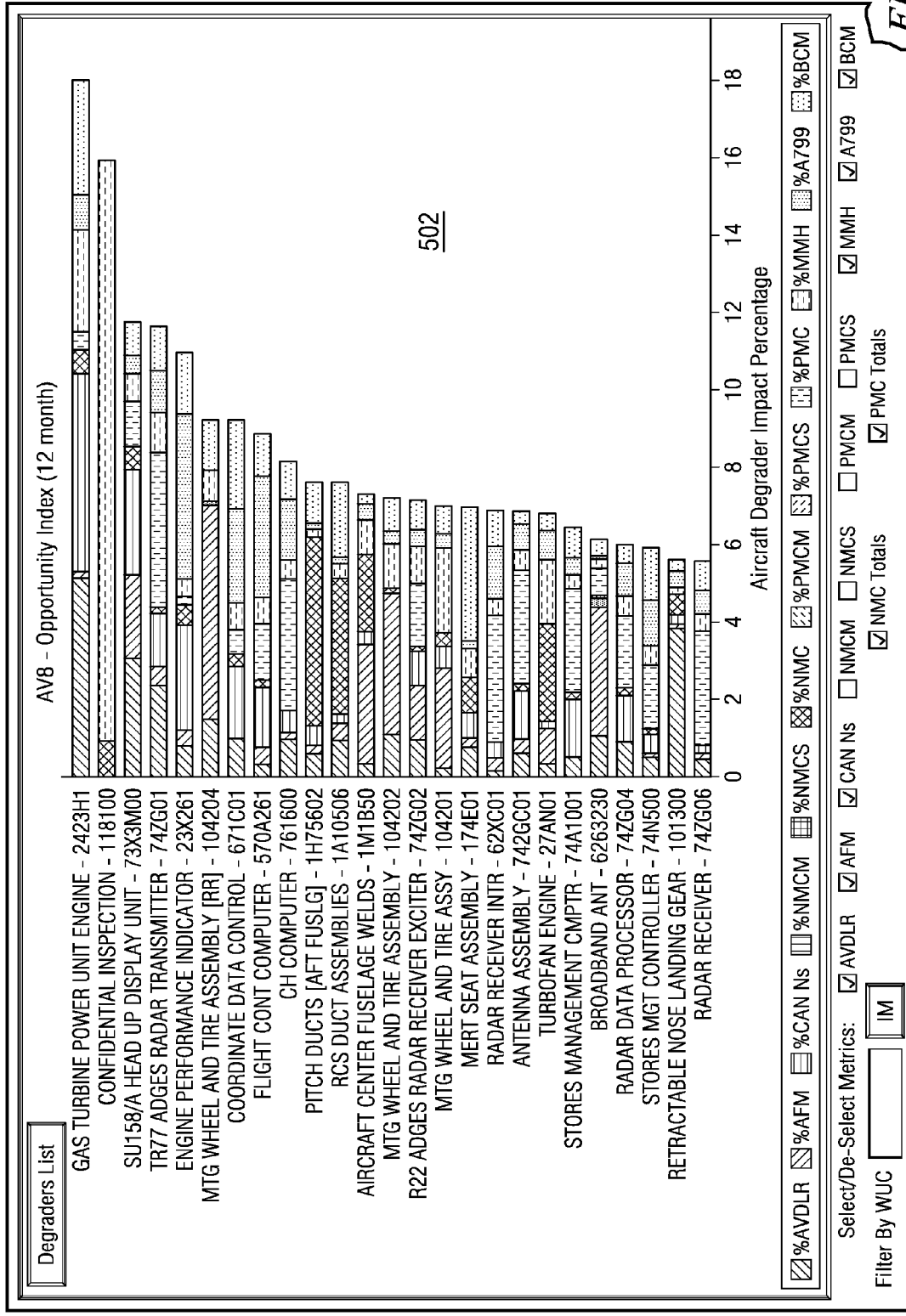
FIG. 5 is a diagram illustrating an opportunity index ranking in accordance with an advantageous embodiment.

With reference now to FIG. 5, a diagram illustrating an opportunity index ranking is depicted in accordance with an advantageous embodiment. Report 500 may be generated by data analysis unit 308 in FIG. 3. In this example, report 500 is an example of one report that may be generated for an opportunity index. In this example, report 500 includes bars in section 502 to identify the impact of a particular component for a metric with respect to the entire part.

In these examples, the impact of a particular component is expressed in a percentage. This percent may be identified, in these examples, by taking the sum of the individual component impact for a given period of time and dividing this value by the sum of the impact contributed by all of the components in the part.

In this example, report 500 may rank each component based on the sum of all metric percentages for the component. The component with the greatest sum or ranking may be identified with the component as having the greatest opportunity for improvement. As a result, report 500 may be used to identify components that may have the greatest impact on the part if improvement for the part occurs for the particular metric.

With reference now to FIG. 6, a diagram of sequenced events is depicted in accordance with an advantageous embodiment. Report 600 is an example of a report that may be created by data consolidation and summarization 340 in FIG. 3. In this example, report 600 is a summary of events found in sections 602, 604, 606, and 608. These events are listed in a sequence for use in performing different analysis for parts.

Figure 7:
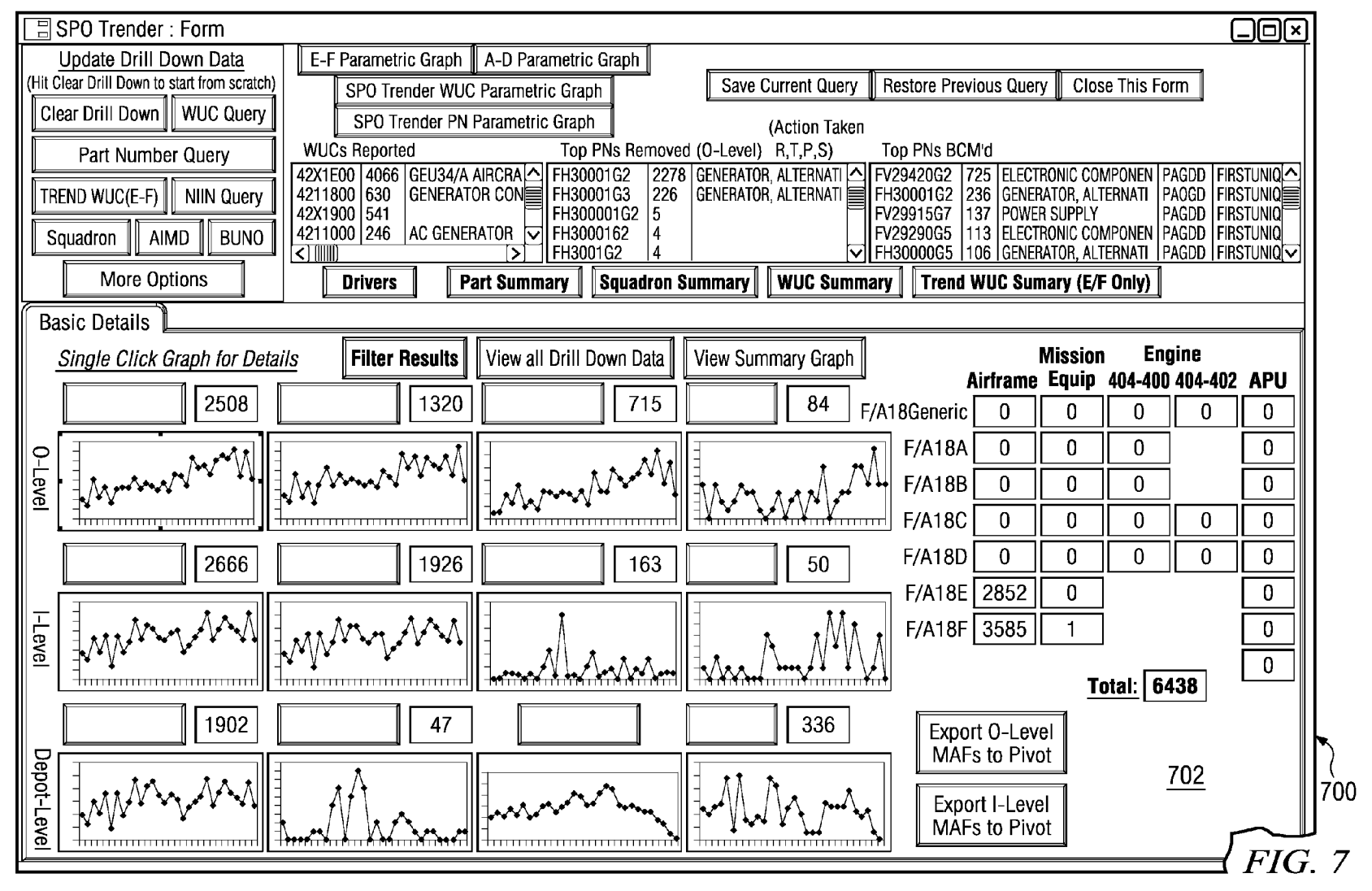

With reference now to FIG. 7, an illustration of metric calculations is depicted in accordance with an advantageous embodiment. In this example, report 700 displays graphs of metric calculations in section 702. Report 700 may be generated by metric calculations unit 306 in FIG. 3.

Figure 8:
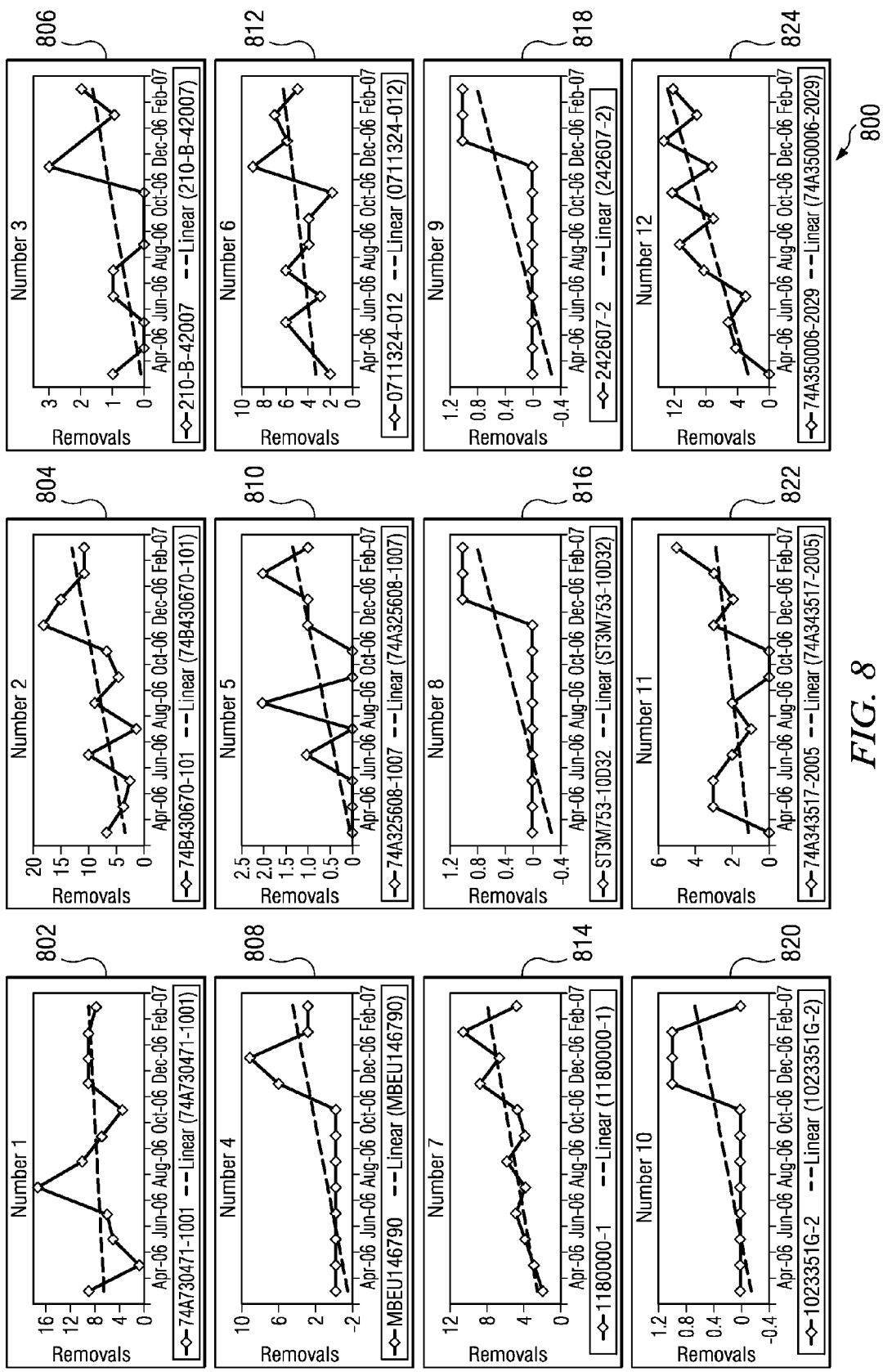
FIG. 8 is an example of a graphical trigger output in accordance with an advantageous embodiment.

With reference now to FIG. 8, an example of a graphical trigger output is depicted in accordance with an advantageous embodiment. Report in 800 may be generated by data analysis unit 308 in FIG. 3 and shows the top twelve parts based on the number of removal actions as the metric. In this example, report 800 illustrates a trigger output for twelve parts as shown in sections 802, 804, 806, 808, 810, 812, 814, 816, 818, 820, 822, and 824. These sections illustrate removals of parts that have been identified as being in a degrading or unacceptable condition. In each section, the X-Axis shows the time in months while the Y-Axis shows the number of removals. In this example, the selected metric is the number of removal maintenance actions that occur. These different parts may be ranked based on the T test value.

Figures 9, 10:
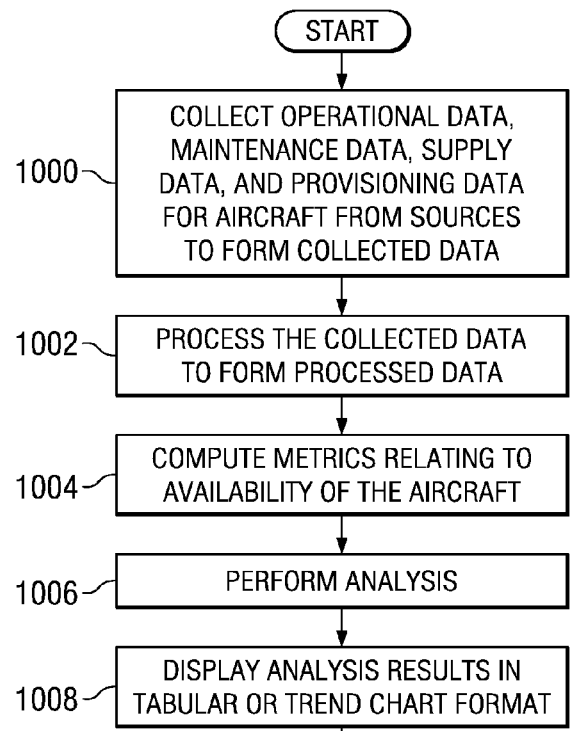
FIG. 9 is a table illustrating a tabular form of a trigger output in accordance with an advantageous embodiment.
FIG. 10 is a flowchart of a process for identifying reliability events that impact aircraft availability in accordance with an advantageous embodiment.

With reference now to FIG. 9, a table illustrating a tabular form of a trigger output is depicted in accordance with an advantageous embodiment. This table also may be generated by data analysis unit 308 in FIG. 3.

In this example, all parts are ranked in table 200. Column 902 shows the ranking, column 904 shows the part number, the columns in section 906 show the number of removal maintenance actions that occur over each month. Column 908 shows the T test value. These values are used to determine whether a part is degrading. The process for identifying T-values is described in more detail below in FIG. 14. In these examples, all of the parts have a T test value greater than 2.353 indicating that the part is degrading. The part degrading the most has the highest T test value in these examples.

The different displays and reports illustrated in FIGS. 4-9 are merely illustrative examples of outputs that may be generated by aircraft maintenance analysis tool 300 in FIG. 3. In this example, every step of the repair cycle may be reviewed in the appropriate sequence for comparison against similar types of events that have occurred with other aircraft. These examples merely illustrate examples of some of the formats in which data may be presented to an operator for analysis. These examples are not meant to limit the manner in which data may be presented or displayed to a user. For example, the data generated by data analysis unit 308 in FIG. 3 also may be presented using spreadsheets, documents, and other suitable formats.

With reference now to FIG. 10, a flowchart of a process for identifying reliability events that impact aircraft availability is depicted in accordance with an advantageous embodiment. The process illustrated in FIG. 10 may be implemented in an apparatus, such as aircraft maintenance analysis tool 300 in FIG. 3.

The process begins by collecting operational data, maintenance data, supply data, and provisioning data for aircraft from sources to form collected data (operation 1000). The process then processes the collected data to form processed data (operation 1002). The processing in operation 1002 places the data in a form needed to perform different analysis on aircraft availability. Operation 1002 may, for example, place the collected data in a common format for use. Further, operation 1002 also may correct errors or inconsistencies within the collected data. The process computes metrics relating to the availability of the aircraft (operation 1004).

The process then performs analysis using the metrics (operation 1006). Results from operation 1006 may be reported in tabular or graphical format (operation 1008), with the process terminating thereafter. This analysis may take various forms. For example, the analysis may be performed to identify events that may impact aircraft availability. More specifically, the analysis may include computing trends. From these trends, predicted events, processes for maintenance, reliability issues, and other suitable analysis may be performed. As a specific example, operation 1006 may be performed to predict future aircraft availability.

Figure 11:
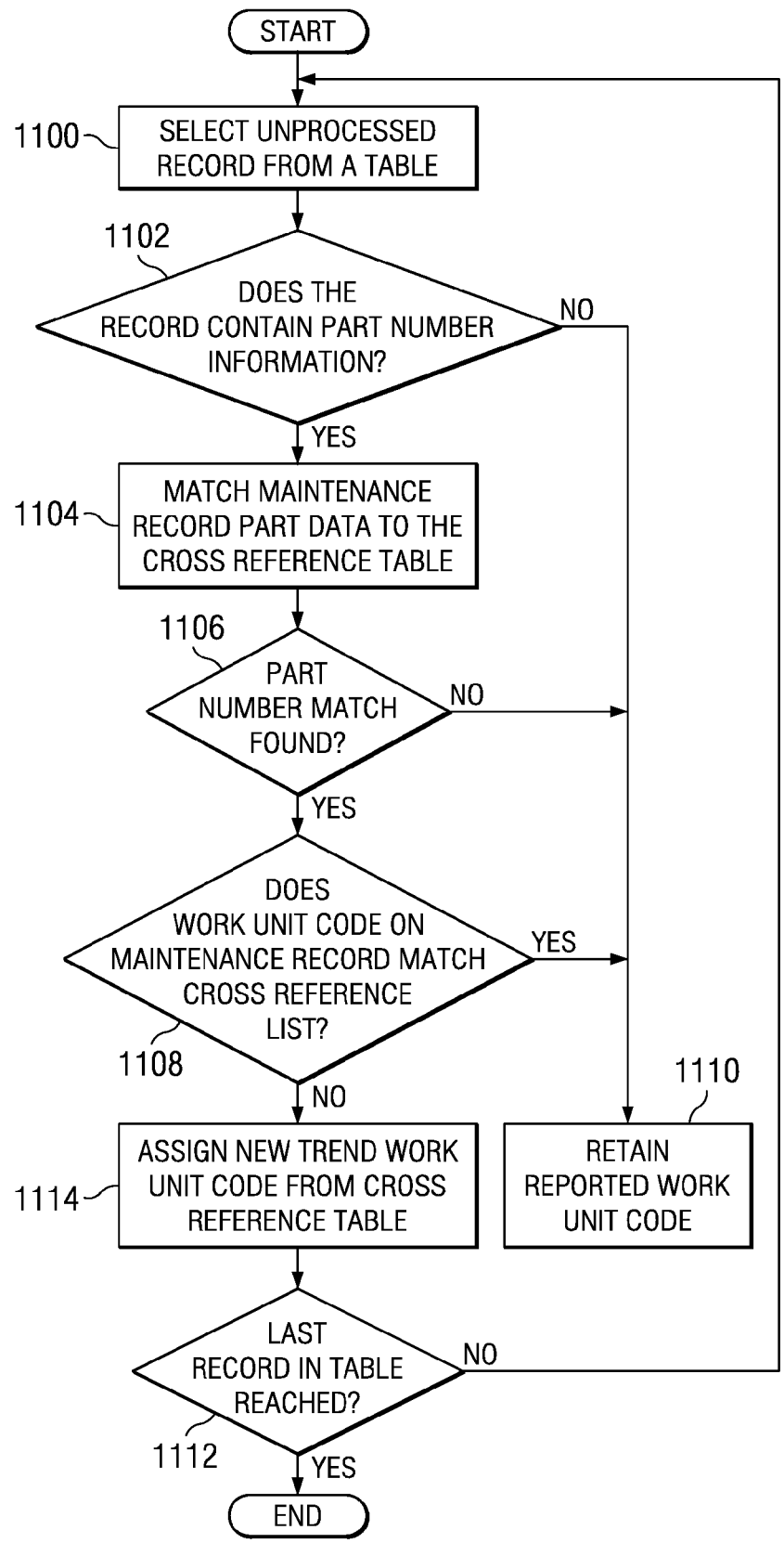
FIG. 11 is a flowchart of a process for assigning trend work unit code in accordance with an advantageous embodiment.
Figure 13:
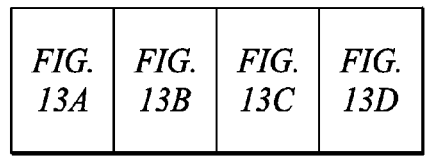
FIGS. 13A-13D are a flowchart for serialized part tracking in accordance with an advantageous embodiment.

With reference now to FIG. 11, a flowchart of a process for assigning trend work unit codes is depicted in accordance with an advantageous embodiment. The process illustrated in FIG. 11 may be used to assign trend work unit codes to data. This process may be performed by data cleansing 342 in data processing unit 304 in FIG. 3. This process is an example of one process that may be performed to condition data for metric calculations and/or other processing within aircraft maintenance analysis tool 300 in FIG. 3.

A work unit code may be used to identify components of a part using a numbering system. Inaccuracies may result from field reporting, which may require a process to correct the work unit code in the data. With consistent and correct work unit codes, metrics may be more accurately calculated for parts.

In this example, the process begins by selecting an unprocessed record from a table (operation 1100). A determination is made as to whether the record contains part number information (operation 1102). If the record contains part number information, the process matches the maintenance record part data to the cross reference table (operation 1104). Operation 1104 may be performed by matching this data to a work unit code to part number cross reference database. This cross reference table may include provisioning data used to identify the specific part numbers that are associated with a work unit code.

This data may be obtained from a data source, such as from systems logistics integration capability (SLIC) 318, but any aircraft configuration management system can be used to create the part number to work unit code cross reference. The work unit code to part number cross reference list also may be located in a stand alone table or integrated into tables 336 in FIG. 3 in addition to or in place of a database. A determination is made as to whether a part number match is found with the data (operation 1106).

If a part number match is found, a determination is made as to whether the work unit code on the maintenance record matches the cross reference list (operation 1108). If the work unit code on the maintenance record matches the cross reference list, the reported unit code is retained (operation 1110). A determination is made as to whether the last record in the table has been reached (operation 1112). If the last record in the table has been reached, the process terminates. Otherwise, the process returns to operation 1100 to select another unprocessed record from the table.

With reference again to operation 1106, if a part number match is found and a determination is made that the work unit code for that record is incorrect based on data located in the cross-reference list, a trend work unit code may be assigned using the work unit from the cross-reference list. This data is used in place of the reported work unit code in the record. The process then proceeds to operation 1112 as described above.

The process proceeds directly to operation 1110 from operation 1106 if a part number match is not found. The process also proceeds to operation 1110 from operation 1102 if the record does not include part number information. This process is an example of one cleaning process that may be performed on records in a table.

Figure 12:
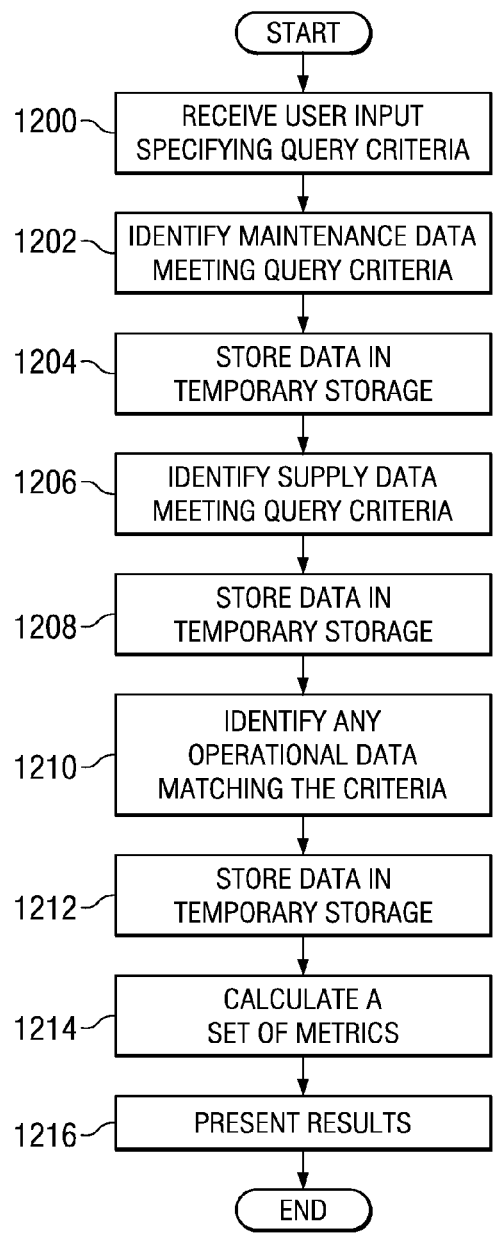
FIG. 12 is a flowchart of a process for identifying trends relating to metrics in accordance with an advantageous embodiment.

With reference now to FIG. 12, a flowchart of a process for identifying trends relating to metrics is depicted in accordance with an advantageous embodiment. The process illustrated in FIG. 12 may be implemented in a component, such as metric calculations unit 306 in FIG. 3.

The process begins by receiving user input specifying query criteria (operation 1200). This criteria includes at least one of a part number, work unit code, trend work unit code, national item identification number (NIIN), organization, aircraft identifier, or some other suitable criteria. As used herein, the phrase "at least one of" when used with a list of items means that different combinations one or more of the items may be used and only one of each item in the list is needed. For example, "at least one of item A, item B, and item C" may include, for example, without limitation, item A or item A and item B. This example also may include item A, item B, and item C; or item B and item C.

The organization in the criteria may be, for example, a squadron, an aircraft entering the maintenance division, or some other suitable organization level. The aircraft identifier may be, for example, a tail number or a serial number.

The process identifies maintenance data meeting the query criteria (operation 1202). Depending on what maintenance data is present, no data from the maintenance data may be identified in operation 1202. The process then stores the data in a temporary storage (operation 1204). The process identifies supply data meeting the query criteria (operation 1206). The process then stores the data in temporary storage (operation 1208). Next, the process identifies any operational data matching the criteria (operation 1210). The identified data is stored in temporary storage (operation 1212).

The process calculates a set of metrics from the data stored in the temporary storage (operation 1214). A set, as used herein, refers to one or more items. For example, a set of metrics is one or more metrics. The process then presents the results (operation 1216), with the process terminating thereafter. From the calculated metrics, various trends may be identified for the different metrics.

With reference now to FIGS. 13A-13D, a flowchart for serialized part tracking is depicted in accordance with an advantageous embodiment. In this example, FIGS. 13A-13D are a flowchart illustrating both data flow and operations that are performed for serialized part tracking. This type of illustration is provided to more clearly illustrate this particular feature in the different advantageous embodiments. In this example, data inputs 1300 are sent for data pre-processing 1302. The results in data pre-processing 1302 are used in sequence logic and calculations 1304.

Through these different sections, the aircraft maintenance analysis tool in the different advantageous embodiments may provide serialized part tracking capabilities for every maintenance event during the life of the part. Serialized parts tracking provides the capability to identify the number of times a serialized part has been through the repair cycle, the specifics of the repair parts used during the repair cycle, and/or the number of operational hours achieved as a result of the repair. The number of times the serialized part has been run through the repair cycle may be used in comparison analysis to identify "bad actors", such as a serialized part that is prone to failure. In many cases, removing the failure prone part from the supply system may be more cost effective rather than continue to expend labor and parts to repair the item.

Details concerning the parts used during repair may be used to identify the most likely failure mode for the serialized part and may be used to identify potential failure events for other serialized parts. The serialized part tracking capability may be used to identify failures across a specific serial number range thus possibly identify a manufacturing defect for a grouping (Lot) of parts. Operational hours achieved as a result of a repair may be used in a metric to determine the effectiveness of the repairs being performed. From this data, identifications of what repair facilities are the most effective may be made. Data obtained from the repair effectiveness analysis may be used to identify a preferred repair facility for a particular part or type of part.

The maintenance events may include, for example, installation events, removal events, intermediate and backshop repairs, depot level repairs, total flight time between repair events, and other suitable events. These events may include different attributes. Examples of some attributes that may be part of an event include, for example, reason for removal and fault identification. The tracking illustrated in FIGS. 13A-13D may provide an ability to track an item through every step of the life cycle.

In these examples, the process begins by processing the various data input provided by data inputs 1300. In this example, production and factory data 1306 is processed to identify aircraft line number and install data for each serialized component (operation 1308). Organizational and intermediate maintenance data 1310 is processed to identify an aircraft identifier and removal data for each serialized component (operation 1312).

This data is also processed to identify an aircraft identifier install data for each serialized component (operation 1314) and identify intermediate repair activities by part number, serial number, and date (operation 1316). In this example, depot level maintenance data 1318 is processed to identify depot repair activities by part number, serial number, and date (operation 1320). A depot may be a facility that performs depot level repairs. Depot facilities typically have a greater capacity to perform repairs including more specialized support equipment, personnel specific expertise and training, and access to a greater spectrum of repair materials.

The data identified in operations 1308, 1312, and 1314 is processed to pair install and removal records based on an aircraft identifier, part number, and serial number (operation 1322). An install record is a record for the installation of a part, while a removal record is a record for the removal of a part. This data is sorted by install data (operation 1324). In these examples, the information is sorted in ascending order. After this processing of data within data pre-processing 1302, the sorted information from operation 1324, the identified information from operation 1320 and operational data 1326 is used within sequencing logic and calculations 1304.

In sequencing logic and calculations 1304, the process selects a first install record in the sequence of records as sorted in operation 1324 (operation 1327).

A determination is made as to whether a removal record exists for the serialized part (operation 1328). If a removal record does exist for the serialized part, a determination is made as to whether the removal date is greater than the install date (operation 1330). If the removal date is not greater than the install date, the install event is discarded (operation 1332). The process then determines whether the current record being processed is the last record in the sequence operation 1332. If the record is not the last record in the sequence, the process selects the next install record in the sequence operation 1351. The process then returns to operation 1328 as described above.

With reference again to operation 1330, if the removal data is greater than the install date, a determination is made as to whether multiple records containing the same install date are present (operation 1334). If multiple records are present containing the same install date, the record with the greatest time span between install and removal dates is identified (operation 1336). The process then calculates flight hours between the install and removal dates for the aircraft identified (operation 1338). Operation 1338 includes using operational data 1326. In this example, operational data 1326 may include daily flight hours per the identified aircraft. The process proceeds directly to operation 1338 from operation 1334 when multiple install records containing the same install date are not present. Multiple records with the same install data may be present because of errors in maintenance reporting. The different advantageous embodiments do not correct these errors in these examples. Instead, a best case scenario is selected in which the record used is the one that spans the greatest period of time.

Thereafter, the process then selects the next install record in the sequence operation 1339. Next, the process determines whether a repair action occurred after removal but before the next installation (operation 1340). The determination performed in operation 1340 is a comparison of three different dates in these examples. These dates are the removal date from operation 1338, installation date from operation 1339, and the repair date from operation 1320.

If the repair date from operation 1320 interrupts or falls between the removal date from operation 1338 and the installation date for operation 1339, the process sums all of the flight hours for the serialized part since the last repair and reports the data range for the flight hours (operation 1342). In operation 1342, a calculation of the sum of all flight hours have accrued before a repair action takes place using the install and removal date on the record being processed. Once a repair action is observed, the flight hours of the install and removal cycles is summed and placed into a temporary storage for use in operations 1348 and 1360.

The process determines whether a repair occurred prior to the earliest date in the range identified in operation 1342 (operation 1346). If a repair did not occur within the earliest date in the range, the process associates the flight hours with the earliest installation event (operation 1348).

The process then creates a consolidated event record that contains the aircraft identifier, the part number, serial number, flight hours, and applicable installation removal and repair details (operation 1350) with the process terminating thereafter.

With reference again to operation 1340, if a repair action did not occur after removal but before the next installation, a determination is made as to whether another installation occurred for the serialized port (operation 1356). If another installation did occur, the process then returns to operation 1351. Otherwise, the process sums all of the flight hours for the event series (operation 1358), with the process then proceeding to operation 1346 as described above.

With reference again to operation 1346, if a repair occurred prior to the earliest date in the range, the process then associates the total flight hours to the prior repair event (operation 1360), with the process then proceeding to operation 1350 as described above. In operation 1328, if a removal record does not exist for the part, the process sums the flight hours for the event series (operation 1362). In operation 1162, the flight hours may be summed for the last install event and/or and flight hours may be summed since the last install date.

With reference again to operation 1333, if the record is the last record in the sequence, the process organizes the incoming records by part number, serial number, and event date (operation 1352). The process then generates a serial number tracking report (operation 1354), with the process terminating thereafter. This report may be, for example, report 600 in FIG. 6.

In this manner, the process in FIGS. 13A-13D performs a series of cross comparisons to ensure that the most accurate event sequencing is achieved. In these examples, each data record provides an aircraft identification, part number, serial number, and event date.

With serialized part tracking, information such as, for example, installation events, removal events, reason for removal, fault identification, intermediate and back shop repairs, depot level repairs, and total flight time between repair events may be tracked.

In data pre-processing 1302, records are grouped by event type consisting of installation records, removal records, intermediate level repair actions, and depot level actions in these examples.

Figure 14:
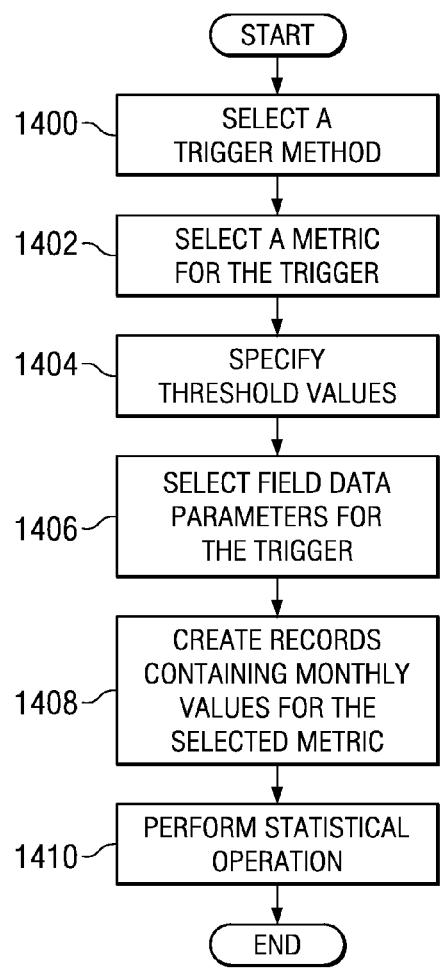
FIG. 14 is a flowchart of a process for identifying equipment within a metric rate of change that is greater than some selected threshold in accordance with an advantageous embodiment.
Figure 13A:
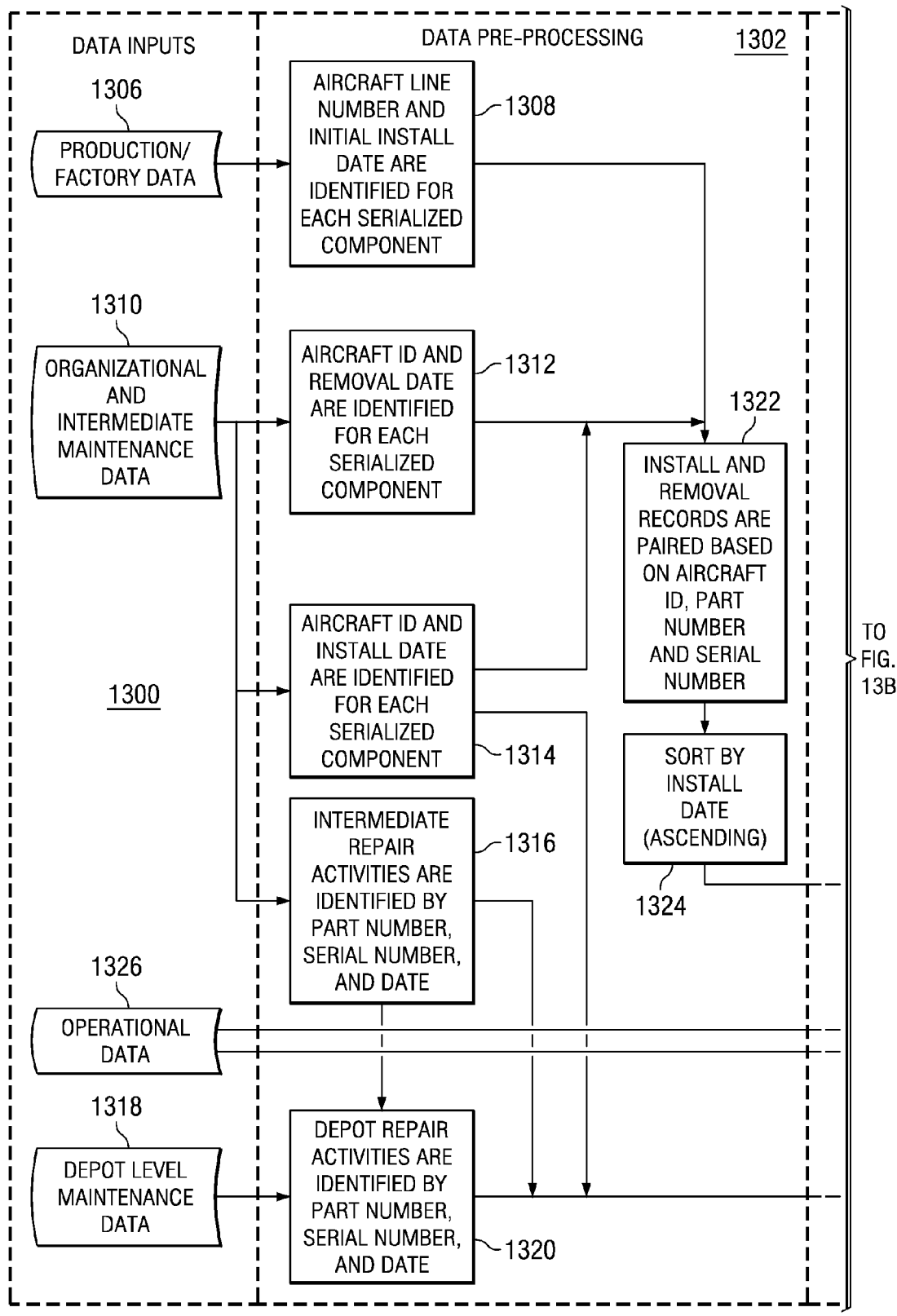
Figure 13B:
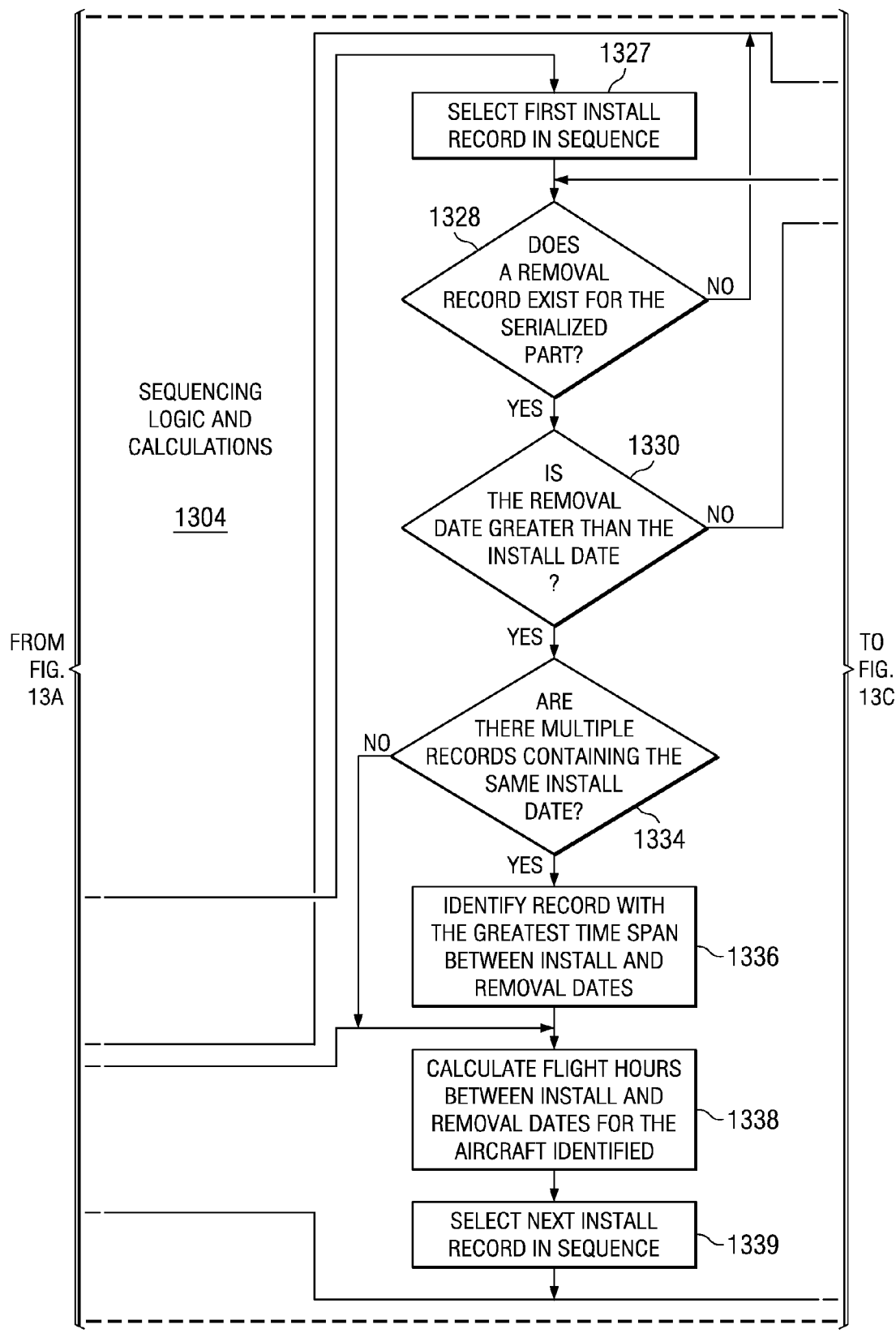
Figure 13C:
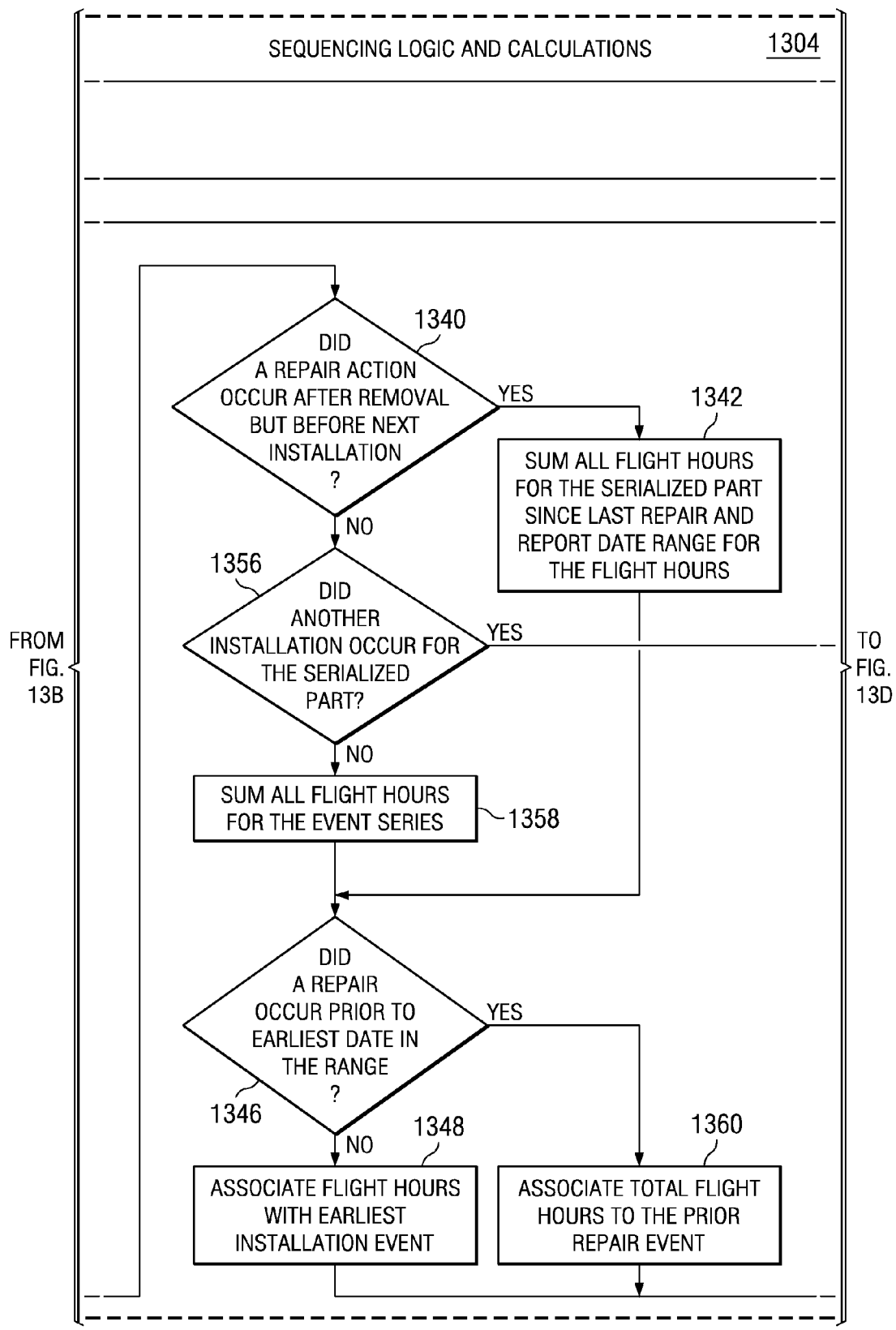
Figure 13D:
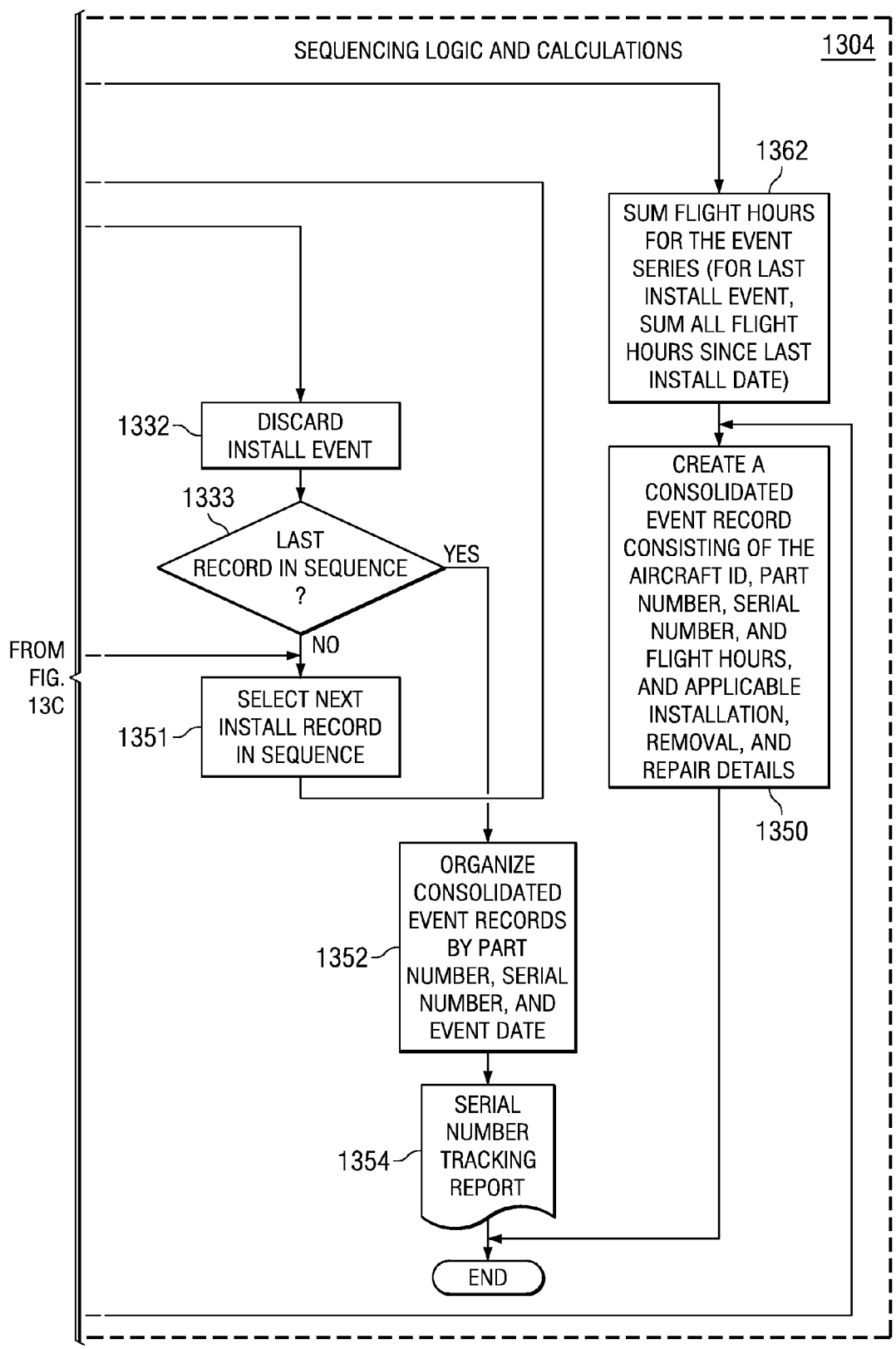

With reference now to FIG. 14, a flowchart of a process for identifying equipment within a metric rate of change that is greater than some selected threshold is depicted in accordance with an advantageous embodiment. In these different advantageous embodiments, the process illustrated in FIG. 14 may be used to generate high driver lists for various metrics that may impact the availability of an aircraft or part.

A driver list is a list that may be used to identify parts that impact the availability of an aircraft. A high driver list is a list that identifies parts that have a greatest effect of an effect that is greater than some threshold. For example, a part may be on a high driver list if the part causes an aircraft to be unavailable more than some number of hours per month. In another example, a part may be on the high driver list if the repair costs are over some amount. The metrics that may be used include, for example, not mission capable hours, cannibalizations, aviation depot level repair costs, aviation fleet maintenance cost, and maintenance man hours.

The process in FIG. 14 may provide information for determining where time and resources should be spent with respect to a set of aircraft in the fleet. High driver lists, such as those generated by the process illustrated in FIG. 14, may be useful as a starting point to identify root causes of problems. By identifying parts that are "high drivers", the solution may be to find a different type of part or manufacturer for the part. In other examples, the identification of a part as a high driver may be to change a maintenance schedule for the part.

Further, the process illustrated in FIG. 14 also may be used to predict future degradation in parts. In these examples, various statistical methods may be implemented including, for example, data averaging, weighted averaging, linear regression, normalized linear regression, modified T-tests, and curve fitting techniques. The different advantageous embodiments in FIG. 14 show one implementation using a modified T-test. Also, the different operations illustrated in this figure also may be used to identify parts that are behaving better than expected. An identification of these types of parts may be used for future provisioning and maintenance planning, which may impact the availability of aircraft in the future. The identification of a set of components that may affect a part and their effect on the availability of aircraft is referred to as a trigger list.

In this example, the process in FIG. 14 begins by selecting a trigger method (operation 1400). This method may be selected for user input in these examples. The selected trigger method may take various forms. The trigger method may include, for example, without limitation, differences in averages, a modified T-test, linear regression, normalized slope analysis, and other suitable methods for performing this type of analysis.

The process then selects a metric for the trigger (operation 1402). For example, the metric may be removals per flight hour, cannibalizations per flight hour, beyond capability or maintenance (BCM) actions per flight hour, maintenance man hours per flight hour, aviation depot repair level (AVDLR) costs per flight hour, discrepancy hour ratio-supply (DHR-S), non mission capable supply (NMCS) hours per equipment in service hour, discrepancy hour ratio-maintenance (DHR-M) or non mission capable maintenance (NMCM) hours per equipment in service (EIS) hour, and other suitable metrics.

The process then specifies threshold values (operation 1404). In these examples, threshold values may be selected based on factors such as, for example, number of events, events per flight hours, rates of change, and other suitable factors. The process selects field data parameters for the trigger (operation 1406). These parameters may include, for example, aircraft models, squadron types, base locations, organizational units, time frame in months, or some other suitable parameter.

The process creates records containing monthly values for the selected metric (operation 1408). This monthly value is created from data including, for example, operational data, organizational and intermediate data, depot maintenance data, and supply data. The process then performs a statistical operation using the selected trigger method and other inputs (operation 1410), with the process terminating thereafter.

Figure 15:
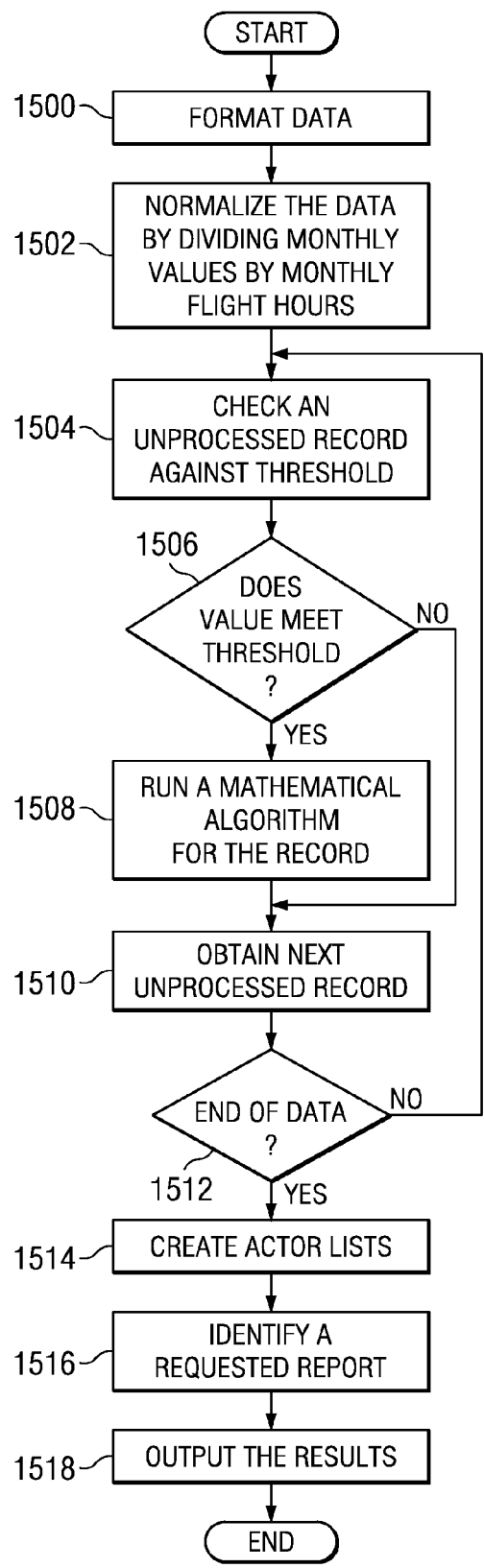
FIG. 15 is a flowchart of a statistical operation in accordance with an advantageous embodiment.

With reference now to FIG. 15, a flowchart of a statistical operation is depicted in accordance with an advantageous embodiment. In this example, the different operations in FIG. 15 are an example of one type of statistical operation that may be performed in operation 1410 in FIG. 14.

The process begins by formatting data (operation 1500). The formatting of data may be performed using components such as, for example, data consolidation and summarization 340 within data processing unit 304 in FIG. 3. The process normalizes the data by dividing monthly values by monthly flight hours (operation 1502). The process checks an unprocessed record in the set of records against a threshold (operation 1504). A determination is made as to whether the value meets the threshold (operation 1506). In these examples, the value is for the particular metric that has been selected in operation 1402 in FIG. 14. If the value in the record meets the threshold for the selected metric, the process runs a mathematical algorithm for the record (operation 1508). The process then obtains the next unprocessed record (operation 1510).

A determination is then made as to whether the end of the data has been reached (operation 1512). If the end of the data has not been reached, the process returns to operation 1504 to check the next unprocessed record against the threshold. The process proceeds to operation 1510 directly from operation 1506 if the value does not meet the threshold.

With reference again to operation 1512, if the end of data has been reached, the process creates actor lists (operation 1514). These actor lists include, for example, stable, degradating, and improving. In these examples, each list contains a label for each part. In other words, the process performed in FIG. 15 may be applied to multiple parts with each part being labeled. The process identifies a requested report (operation 1516). The process then outputs the results (operation 1518) to generate the different reports. The process terminates thereafter. These reports may be in tabular and/or graphical format depending on the particular type of implementation. The output of operation 1518 may be, for example, a list or graphical output.

Figure 16:
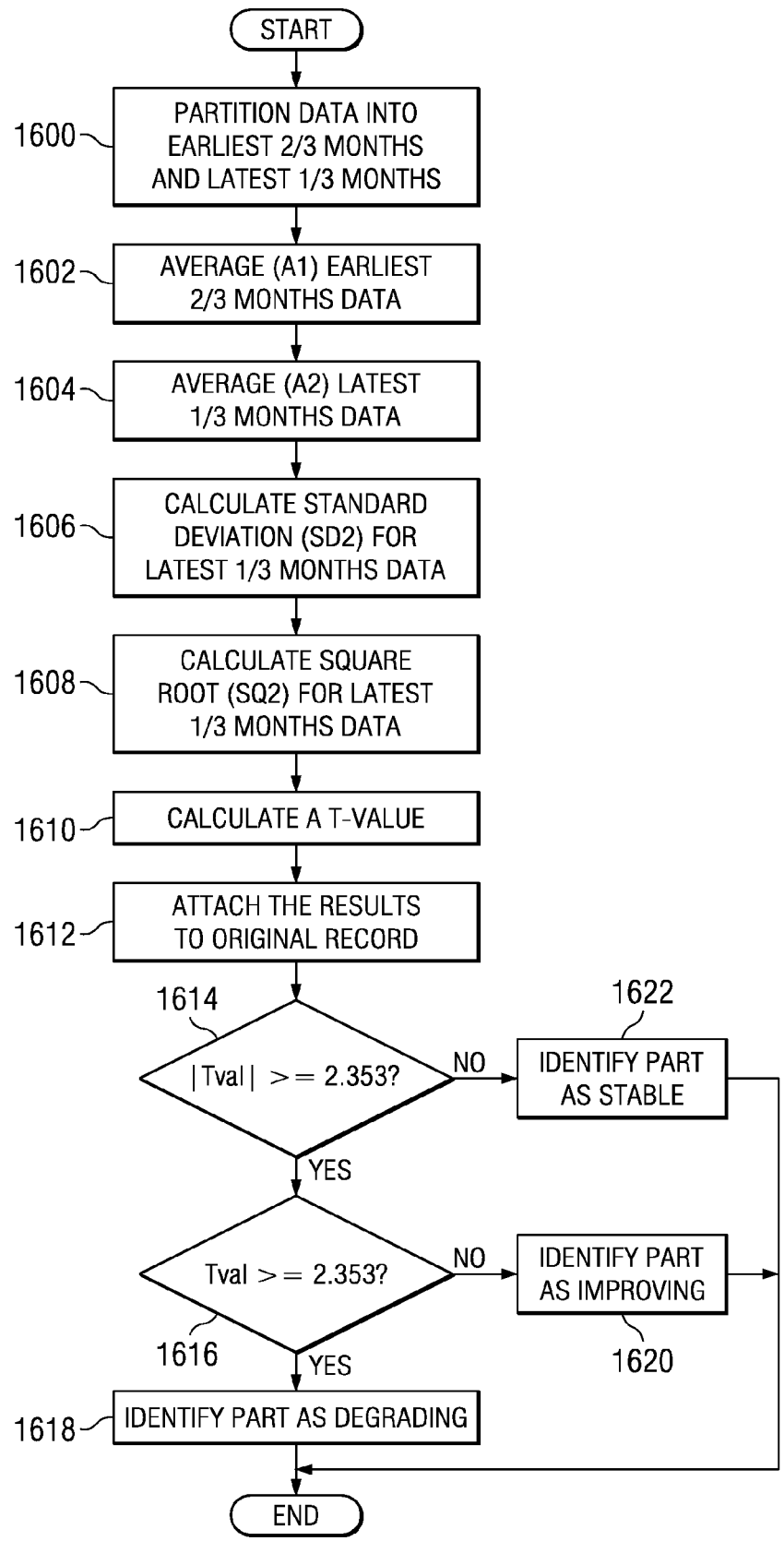
FIG. 16 is a flowchart of a process for performing a mathematical algorithm on monthly records in accordance with an advantageous embodiment.

With reference now to FIG. 16, a flowchart of a process for performing a mathematical algorithm on monthly records is depicted in accordance with an advantageous embodiment. The process illustrated in FIG. 16 is a more detailed illustration of operation 1508 in FIG. 15. The process begins by partitioning data into the data for the earliest 2/3 months and data for the latest 1/3 months (operation 1600). The process averages the data for the earliest 2/3 months (operation 1602). The average in operation 1602 form a value A1. In this example, the data being averaged is the particular metric of interest. The process averages the latest 1/3 months of data (operation 1604). This average forms a value A2.

The process then calculates the standard deviation for the latest 1/3 months data (operation 1606). This standard deviation is referred to as SD2. The process calculates a square root for the latest 1/3 months data (operation 1608). The square root is referred to as SQ2.

The process then calculates a T-value (operation 1610). In this example, the T-value is referred to as Tval and may be calculated as follows $(Tval)=(A2-A1)/SD2 \times SQ2$. The process attaches the results to the original record (operation 1612).

A determination is made as to whether the absolute value of the T-value is greater than or equal to 2.353 (operation 1614). If the absolute value of T-value is greater than or equal to 2.353, a determination is made as to whether T-value is greater than or equal to 2.353 (operation 1616).

If T-value is greater than this value, the part is identified as degradating (operation 1618); otherwise, the part is identified as improving (operation 1620). With reference again to operation 1614, if the absolute value of the T-value is not greater than or equal to 2.353, the part is identified as stable (operation 1622). The process in operations 1622, 1620, and 1618 terminate thereafter.

In these examples, the value 2.353 is an example threshold value for the metric. This number may vary depending on the selection of the confidence level and the amount of data being processed or the degrees of freedom. In this specific example, the value 2.353 represents a T value at a ninety five percent confidence level with three degrees of freedom. The resulting T value may be used to sort out the data to provide a high T value list based on the selected metric.

Figure 17:
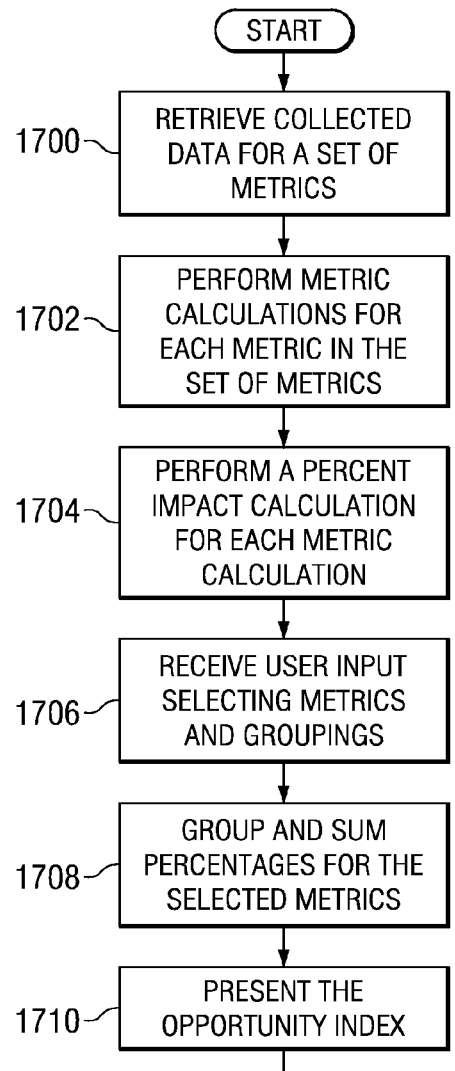
FIG. 17 is a flowchart of a process for generating an opportunity index in accordance with an advantageous embodiment.

With reference now to FIG. 17, a flowchart of a process for generating an opportunity index is depicted in accordance with an advantageous embodiment. The process in FIG. 17 may be used to generate an opportunity index that identifies percent degradation that a component contributes to the overall system performance. This type of information may be evaluated at different levels of detail. These levels of detail include, for example, fleet, squadron, aircraft, system, subsystem, or some other suitable level of detail.

The process begins by retrieving collective data for a set of metrics (operation 1700). In these examples, the metrics may include, for example, non-mission capable supply, non-mission capable maintenance hours, partial mission capable supply, partial mission capable maintenance hours, aviation depot level repair costs, aviation fleet maintenance costs, cannibalizations, maintenance man hours, no fault found and cannot duplicate events, beyond capability of maintenance, and other suitable metrics. The process performs metric calculations for each metric in the set of metrics (operation 1702). The process then performs a percent impact calculation for each metric calculation performed in operation 1702 (operation 1704).

In these depicted examples, conditioned data may be obtained for these calculations from a supply table in tables 336 in FIG. 3 for cost related metrics or data may be obtained from the maintenance table for all remaining metrics. Each record in this table may have an associated, aviation fleet maintenance cost, or aviation depot level repair cost. Also, each record in the maintenance table in tables 336 in FIG. 3 may contain non-mission capable supply hours, non-mission capable maintenance hours, partial mission capable supply hours, partial mission capable maintenance hours, cannibalizations identification, maintenance man hours, no fault found identification, or beyond capability of maintenance identification.

A component's individual impact percentage is calculated for each of the metric categories listed above by grouping the records by work unit code and metric category and taking the sum of the individual component impact for a given period of time and dividing it by the sum of impact contributed by all work unit codes for the same metric.

The process receives user input selecting metrics and groupings (operation 1706). The process groups and sums percentages for the selected metrics (operation 1708). The process then presents the opportunity to index (operation 1710), with the process terminating thereafter. The presentation of opportunity index may take the form of a report presented on a data processing system, such as report 700 in FIG. 7. The presentation may take other forms, including, for example, a printed report, a data file, or some other suitable mode of presentation.

Thus, the different advantageous embodiments provide a computer implemented method, apparatus, and computer usable program code for performing aircraft availability analysis. In the different advantageous embodiments, the tool is a tool collecting data from multiple sources and processing the data into a format for use in performing analysis to identify events that may impact the aircraft availability. Further, the different advantageous embodiments may also be used to predict future aircraft availability as well as identify processes or programs for maintenance.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art.

Further, different advantageous embodiments may provide different advantages as compared to other advantageous embodiments. For example, although the different illustrative embodiments have been described with respect to aircraft, other embodiments may be applied to other types of vehicles, such as, for example, spacecraft, submarines, ships, cars, trucks, trains, and other suitable vehicles.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for identifying events that impact aircraft availability, the method comprising:
    collecting operational data, maintenance data, supply data, and provisioning data for a plurality of aircraft from a plurality of sources to form collected data;
    processing the collected data to form processed data containing a plurality of events, wherein the processed data is in a form needed to perform an analysis on the aircraft availability for the plurality of aircraft;
    calculating a set of metrics relating to the aircraft availability for the plurality of aircraft from the processed data to form a set of calculated metrics; and
    identifying a set of trends relating to the set of calculated metrics affecting availability of the plurality of aircraft.

2. The method of claim 1 further comprising:
    generating a prediction of future aircraft availability for the plurality of aircraft from the set of trends.

3. The method of claim 1, wherein the collected data is for a set of parts for the plurality of aircraft.

4. The method of claim 3, wherein the set of parts is selected from at least one of a component, a subsystem, a system, and an aircraft in the plurality of aircraft.

5. The method of claim 1, wherein the processing step comprises:
    preprocessing the collected data for a plurality of parts; and
    sequencing a plurality of maintenance events for the plurality of parts for the plurality of aircraft.

6. The method of claim 1 further comprising:
    generating a driver list for a part.

7. The method of claim 6, wherein the generating step comprises:
    identifying a trigger method;
    identifying a metric for the trigger method;
    identifying a set of field data parameters for the trigger method;
    creating a data set from the collected data for the metric and the part; and
    performing a statistical operation using the trigger method, the metric, the set of field data parameters, and the data set to generate a result about the part.

8. The method of claim 7, wherein the result identifies the part as one of stable, improving, and degrading.

9. The method of claim 8 further comprising:
    generating an opportunity index identifying an amount of degradation that the part contributes to performance of the plurality of aircraft.

10. The method of claim 9, wherein the performance of the plurality of aircraft is for the plurality of aircraft, a portion of the plurality of aircraft, a single aircraft, a system in the aircraft, or a subsystem in the aircraft.

11. The method of clam 7, wherein the trigger method is a statistical method selected from one of data averaging, weighted averaging, linear regression, normalized linear regression, modified T-test, and curve fitting.

12. An apparatus comprising:
    a data collection unit that collects operational data, maintenance data, supply data, and provisioning data for a plurality of aircraft from a plurality of sources to form collected data;
    a data processing unit that processes the collected data to form processed data containing a plurality of events, wherein the processed data is in a form needed to perform an analysis on aircraft availability for the plurality of aircraft;
    a metric calculation unit that calculates a set of metrics relating to the aircraft availability for the plurality of aircraft from the processed data to form a set of calculated metrics;
    a data analysis unit that identifies a set of trends using the set of calculated metrics affecting availability of the plurality of aircraft; and
    a set of data processing systems, wherein the data collection unit, the data processing unit, the metric calculation unit, and the data analysis unit execute on the set of data processing systems.

13. The apparatus of claim 12, wherein the data analysis unit generates a prediction of future aircraft availability for the plurality of aircraft from the set of trends.

14. The apparatus of claim 12, wherein the data analysis unit generates a driver list for a part.

15. The apparatus of claim 14 wherein the data analysis unit identifies a trigger method; identifies a metric for the trigger method, identifies a set of field data parameters for the trigger method; creates a data set from the collected data for the metric and the part; and performs a statistical operation using the trigger method, the metric, the set of field data parameters, and the data set to generate a result about the part.

16. A computer program product for identifying reliability events that impact aircraft availability, the computer program product comprising:
   a computer recordable storage medium;
   program code, stored on the computer recordable storage medium, for collecting operational data, maintenance data, supply data, and provisioning data for a plurality of aircraft from a plurality of sources to form collected data;
   program code, stored on the computer recordable storage medium, for processing the collected data to form processed data containing a plurality of events, wherein the processed data is in a form needed to perform an analysis on the aircraft availability for the plurality of aircraft;
   program code, stored on the computer recordable storage medium, for calculating a set of metrics relating to the aircraft availability for the plurality of aircraft from the processed data to form a set of calculated metrics; and
   program code, stored on the computer recordable storage medium, for identifying a set of trends relating to the set of calculated metrics affecting availability of the plurality of aircraft.

17. The computer program product of claim 16 further comprising:
   program code, stored on the computer recordable storage medium, for generating a prediction of future aircraft availability for the plurality of aircraft from the set of trends.

18. The computer program product of claim 16, wherein the collected data is for a set of parts for the plurality of aircraft.

19. The computer program product of claim 18, wherein the set of parts is selected from at least one of a component, a subsystem, a system, and an aircraft in the plurality of aircraft.

20. The computer program product of claim 16, wherein the program code, stored on the computer recordable storage medium, for processing the collected data to form the processed data containing the plurality of events comprises:
   program code, stored on the computer recordable storage medium, for preprocessing the collected data for a plurality of parts; and
   program code, stored on the computer recordable storage medium, for sequencing a plurality of maintenance events for the plurality of parts for the plurality of aircraft.

* * * * *